US009628227B2

(12) United States Patent  
Aiba et al.

(10) Patent No.: US 9,628,227 B2
(45) Date of Patent: Apr. 18, 2017

(54) MOBILE COMMUNICATION METHOD AND SYSTEM FOR SOUNDING REFERENCE SIGNAL TRANSMISSION, AND BASE STATION, USER EQUIPMENT AND INTEGRATED CIRCUIT THEREIN

(75) Inventors: Tatsushi Aiba, Osaka (JP); Lei Huang, Osaka (JP); Shoichi Suzuki, Osaka (JP); Wataru Ouchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 904 days.

(21) Appl. No.: 13/520,700

(22) PCT Filed: Dec. 22, 2010

(86) PCT No.: PCT/JP2010/073854
§ 371 (c)(1),
(2), (4) Date: Jul. 5, 2012

(87) PCT Pub. No.: WO2011/083746
PCT Pub. Date: Jul. 14, 2011

(65) Prior Publication Data
US 2012/0281654 A1 Nov. 8, 2012

(30) Foreign Application Priority Data

Jan. 8, 2010 (JP) ................................. 2010-003393

(51) Int. Cl.
*H04L 5/00* (2006.01)
(52) U.S. Cl.
CPC ............ *H04L 5/0007* (2013.01); *H04L 5/001* (2013.01); *H04L 5/0048* (2013.01); *H04L 5/0053* (2013.01)
(58) Field of Classification Search
CPC ....... H04L 5/007; H04L 5/001; H04L 5/0048; H04L 5/0054; H04W 72/04; H04W 72/12
(Continued)

(56) References Cited

U.S. PATENT DOCUMENTS

2004/0179627 A1* 9/2004 Ketchum et al. ............. 375/267
2009/0181687 A1* 7/2009 Tiirola et al. ................. 455/450
(Continued)

FOREIGN PATENT DOCUMENTS

WO  WO 2008/156063 A1  12/2008
WO  WO 2010/107880 A2   9/2010

OTHER PUBLICATIONS

"3rd Generation Partnership Project; Technical Specification Group Radio Access Network; Evolved Universal Terrestrial Radio Access (E-UTRA); Physical layer procedures (Release 8)," 3GPP TS 36.213, V8.8.0, Sep. 2009, pp. 1-77.
(Continued)

*Primary Examiner* — Stephen J Clawson
(74) *Attorney, Agent, or Firm* — Birch, Stewart, Kolasch & Birch, LLP

(57) ABSTRACT

A communication method for sounding reference signal transmission is provided. A communication method of a user equipment in a mobile communication system in which a base station apparatus schedules a physical uplink shared channel in an uplink component carrier by using a downlink control information format, the method comprising: receiving, from the base station apparatus, the downlink control information format including first information which instructs to transmit sounding reference signal and second information which indicates the uplink component carrier in which the physical uplink shared channel is scheduled by the downlink control information format, transmitting, to the base station apparatus, sounding reference signal on the uplink component carrier indicated by the second information in case that the first information is detected.

14 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2009/0286562 | A1* | 11/2009 | Gorokhov | 455/501 |
| 2010/0040036 | A1* | 2/2010 | Ofuji et al. | 370/344 |
| 2010/0197336 | A1 | 8/2010 | Kishiyama et al. | |
| 2011/0176480 | A1* | 7/2011 | Dahlman et al. | 370/328 |
| 2012/0076037 | A1* | 3/2012 | Noh et al. | 370/252 |

OTHER PUBLICATIONS

"Carrier aggregation in LTE-Advanced," TSG-RAN WG1 #53bis R1-082468, Ericsson, Jun. 30, 2008 to Jul. 4, 2008.
"Channel sounding enhancements for LTE-Advanced," 3GPP TSG RAN WG1 Meeting #59 R1-094653, Nokia Siemens Networks, Nokia, Nov. 9 to 13, 2009.
"TP for TR36.814 on downlink control signalling for carrier aggregation," 3GPP TSG RAN WG1 Meeting #59 R1-094959, LTE-Advanced Rapporteur (NTT DOCOMO), Nov. 9 to 13, 2009.
International Search Report issued in PCT/JP2010/073854, mailed on Apr. 19, 2011.
"Proposal on aperiodic SRS features" XP050598646, Aug. 23-27, 2010.
"Simulation Results for Multi-shot Dynamic Aperiodic SRS", XP050489583, Nov. 15-19, 2010.
"3rd Generation Partnership Project; Technical Specification Group Radio Access Network; Evolved Universal Terrestrial Radio Access (E-UTRA); Physical layer procedures (Release 9)" XP050401048, Dec. 2009.
"SRS for Carrier Aggregation in LTE-Advanced" XP050389161, Nov. 9-13, 2009.
"SRS Transmission Issues in LTE-A, XP050339373", May 4-8, 2009.
Search Report for corresponding European patent application. No. 10842257.7 dated Apr. 18, 2013.

* cited by examiner

F I G. 1
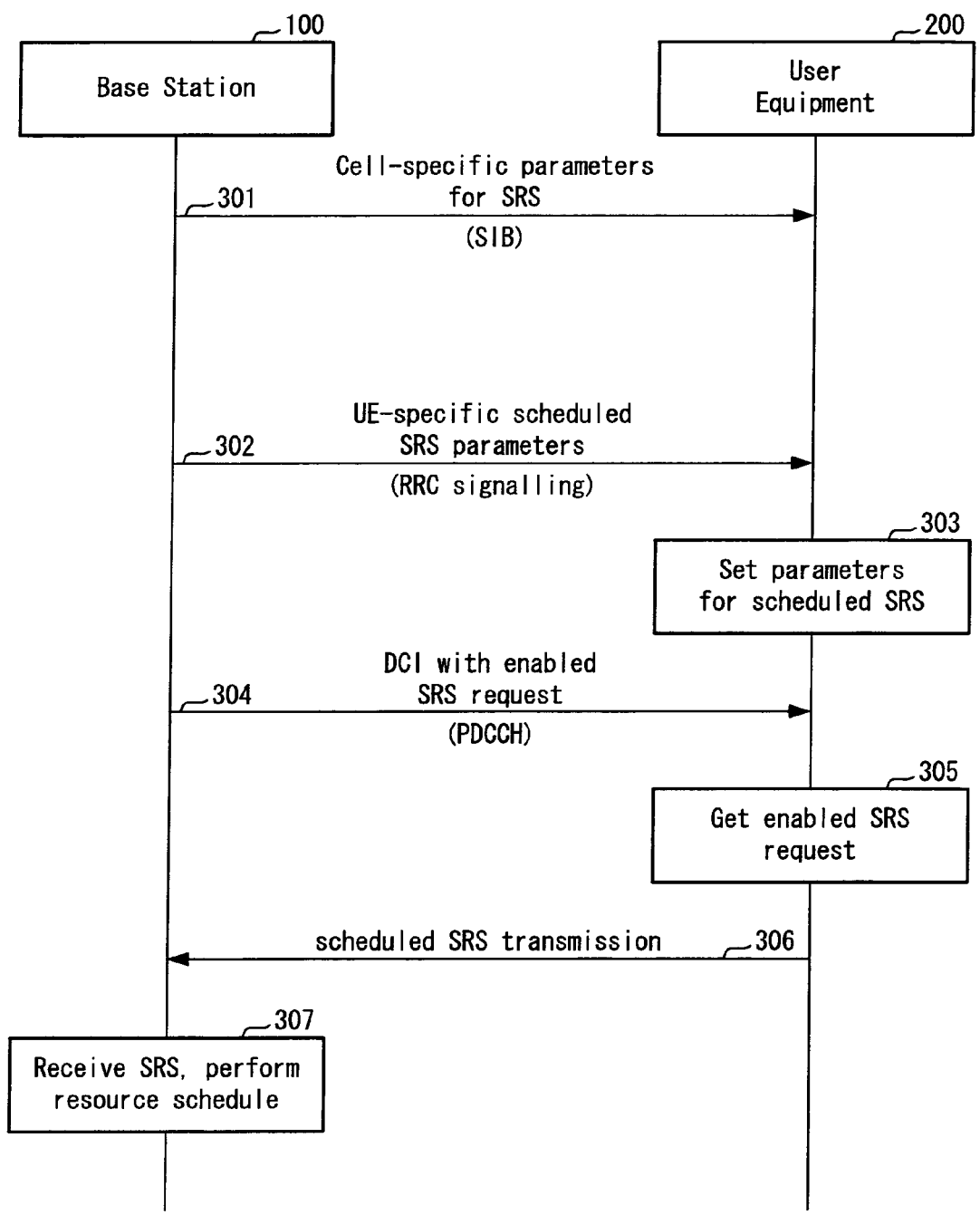

F I G. 3
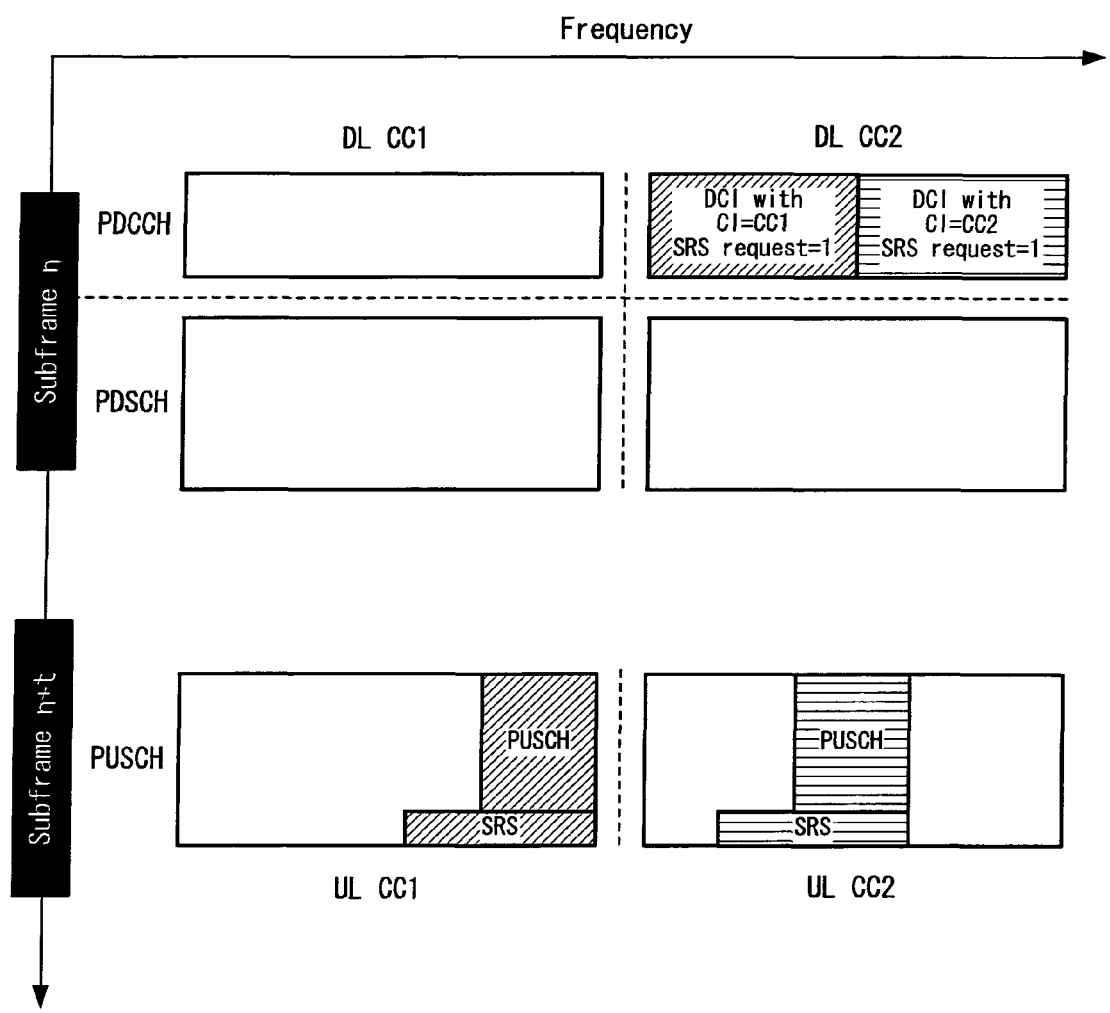

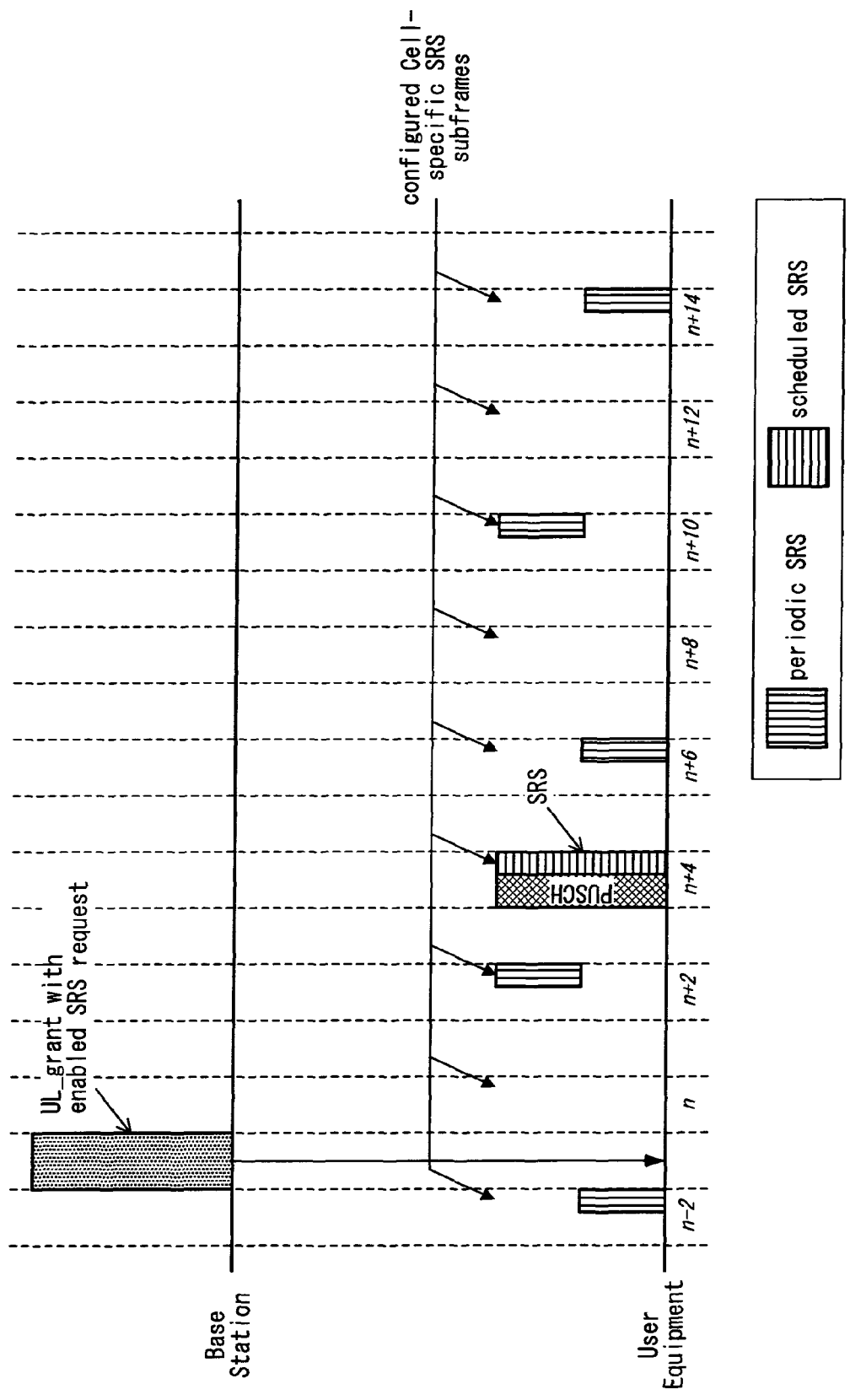
F I G. 4

MOBILE COMMUNICATION METHOD AND SYSTEM FOR SOUNDING REFERENCE SIGNAL TRANSMISSION, AND BASE STATION, USER EQUIPMENT AND INTEGRATED CIRCUIT THEREIN

TECHNICAL FIELD

The present invention relates to a communication technique, and particularly, to a mobile communication method and system for sounding reference signal transmission and a base station, a user equipment and integrated circuits used therein.

BACKGROUND ART

3GPP (The 3rd Generation Partner Project) standardization organization is working out the next generation of wireless communication standard which is named LTE (Long Term Evolution). In a physical layer interface, the new standard adopts OFDM (Orthogonal Frequency Division Multiplexing) technology, which is different from conventional CDMA (Code Division Multiple Access) technology. In LTE, OFDMA (Orthogonal Frequency Division Multiple Access) is used in downlinks (DL) and SC-FDMA (Single Carrier Frequency Division Multiple Access) is used in uplinks (UL). The technology used in the new standard is effective for multi-path propagation, with adoption of frequency domain equalization reducing complexity of the conventional time domain equalization, and is more suitable for bandwidth high-speed data transmission.

In the LTE system, according to scheduling of eNB (evolved NodeB), UE (User Equipment) sends SRS (Sounding Reference Signal) in the uplink. The SRS is designed as a wideband sounding signal to facilitate UL frequency-selective scheduling as well as other purposes such as UL power control, time tracking, etc. In TDD (Time Division Duplexing) system, the SRS may also be used for downlink scheduling via exploitation of channel reciprocity. According to the current standardization of LTE (see Non-Patent Document 1 below), main procedures for SRS transmission include: eNB (or base station) broadcasts to the UEs (or mobile station) common cell-specific SRS configuration parameters in a designated cell as needed; the eNB sends UE-specific RRC signaling (Radio Resource Control signaling) to the UE to configure dedicated SRS parameters for a designated UE; then the UE sends the SRS according to the parameters in the configured bandwidth and subframes periodically. For example, the eNB configures to the UE {2, 5, 10, 20, 40, 80, 160, 320} ms as periodicity (SRS transmission interval). Hereinafter, this periodical SRS transmission is described as "periodic SRS (periodic SRS transmission)". In addition, in LTE, the eNB may configure one-time periodic SRS transmission to the UE by using the UE-specific RRC signaling and the eNB may semi-statically send the RRC signaling (e.g. per 100 ms).

The 3GPP is also working out LTE-Advanced (Advanced-LTE) which is likely the major enhancements to LTE. The LTE-Advanced will be introduced in Release 10 after a correction and improvement phase in LTE Release 9. The LTE-Advanced shall fulfill the requirements as set by ITU (International Telecommunication Union). In LTE-Advanced, the SRS may be used for CSI (Channel State Information) estimation at multiple cells exploiting the channel reciprocity in addition to the above purposes for LTE. The SRS design needs to take into account the LTE-Advanced features such as multiple transmit antennas, CoMP (Coordinated Multipoint Transmission/Reception), supporting heterogeneous networks, etc.

Regarding the SRS transmission for the LTE-Advanced, it is proposed one scheduled (a periodic/one shot) SRS scheme (see Non-Patent Document 2 below). In this scheme, the SRS parameters for scheduled SRS are configured via higher layer signaling. The scheduled SRS is triggered using SRS-indicator included in an UL grant (an UL transmission permission signal) and the eNB dynamically sends the UL grant (e.g. per 1 ms). Additionally, it is proposed to define a new PDCCH (Physical Downlink Control Channel) format for triggering the scheduled SRS for many UEs at the same time without the need for scheduling the PUSCH (Physical Uplink Shared Channel). The scheduled SRS is a kind of "one-shot" allocation/transmission by nature.

Furthermore, in LTE-Advanced, carrier aggregation is supported in order to support wider transmission bandwidth (see Non-Patent Document 3 below). It is stated that LTE-Advanced should support wider bandwidth than LTE Release 8, up to 100 MHz. Typically contiguous spectrums is used, but the non-contiguous spectrums should be also supported considering reasonable UE complexity. An obvious way of fulfilling this requirement is to use carrier aggregation, where multiple component carriers are aggregated to the desired LTE-Advanced system bandwidth. In principle, the component carriers may be either contiguous or non-contiguous in frequency. The base station (BS) and the user equipment may communicate on the wider transmission bandwidth with aggregate multiple component carriers. For example, the base station and the user equipment may communicate on 100 MHz bandwidth which is aggregated by five 20 MHz component carriers (5×20 MHz=100 MHz). The component carrier is respective frequency bandwidth (or respective carrier frequency) which consists of the wider transmission bandwidth. In details, the base station and the user equipment may communicate by using aggregated multiple DL CCs (Downlink Component Carriers(s)) and aggregated multiple UL CCs (Uplink Component Carrier(s)). Here, the number of the DL CCs and the number of the UL CCs may be the same, i.e., Symmetric carrier aggregation. Alternatively, the number of the DL CCs and the number of the UC CCs may be different, i.e., Asymmetric carrier aggregation.

To well support the carrier aggregation, cross-carrier scheduling (scheduling over the component carriers) and relevant control signaling is widely discussed. Regarding the control signaling of resource assignments for PDSCH (Physical Downlink Shared Channel) and PUSCH, the following mechanisms are supported (see Non-Patent Document 4 below): the PDCCH (for the DL or UL) on a component carrier assigns the PDSCH resources on the same component carrier and the PUSCH resources on a single linked uplink component carrier (UL CC). The LTE (Release 8) PDCCH structure, which includes coding, CCE (Control Channel Element)-based resource mapping and etc, is used on each component carrier. The same formats for the LTE (Release 8) PDCCH (DCI (Downlink Control Information) format) are used on each component carrier. Furthermore, the PDCCH on a component carrier may assign the PDSCH resources or the PUSCH resources in one of multiple component carriers using a carrier indicator (CI) field, where the DCI formats are extended with a fixed 3 bit CI field. The eNB may assign the PDSCH resources or the PUSCH resources to the UE by using the PDCCH including the CI field which indicates the scheduled component carrier.

Non-Patent Document 1: "3GPP TSG RAN E-UTRA Physical layer procedure (Release 8)", 3GPP TS 36.213 V8.8.0, 2009-09.

Non-Patent Document 2: "Channel sounding enhancements for LTE-Advanced", 3GPP TSG RAN WG1 Meeting #59, R1-094653, November 2009.

Non-patent Document 3: "Carrier aggregation in LTE-Advanced", 3GPP TSG RAN WG1 Meeting #53bis, R1-082468, June, 2008.

Non-patent Document 4: "TP for TR36.814 on downlink control signaling for carrier aggregation", 3GPP TSG RAN WG1 Meeting #59, R1-094959, November 2009.

However, in the above conventional techniques, there is no concrete description on what kind of exchange is made between the eNB and the UE to transmit the scheduled SRS. Namely, it is only worded that the SRS parameters for the scheduled SRS are configured via higher layer signaling, there is no concrete description on how the eNB configures the UE to send the scheduled SRS, and how the UE sends the scheduled SRS to the eNB.

Regarding the SRS transmission in LTE-Advanced, in order to achieve efficient scheduling by the eNB, it requires shorter period and/or wider bandwidth SRS transmission, which in turn results in consumption of more SRS resources. Performance of the SRS transmission may become a limiting bottleneck for efficiently scheduling by the eNB. Additionally, the eNB should consider interferences in the cell caused by sending the SRS from UEs. For example, when a UE sends the uplink data (transport block for UL-SCH (UL-Shared Channel)) by using the PUSCH, if another UE sends the SRS in the same subframe, it comes up with the interference in the cell because the PUSCH resources and the SRS resources are overlapped (collided).

The present invention has been made in view of the foregoing circumstances, and its object is to provide a mobile communication method, system, a base station and a user equipment and integrated circuits used therein, which may perform flexible transmission control for the scheduled SRS transmission, and achieve more efficient transmission control (scheduling) between the eNB and the UE.

SUMMARY OF INVENTION

According to a first aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, the downlink control information format including first information which instructs to transmit a sounding reference signal and second information which indicates the uplink component carrier in which the physical uplink shared channel is scheduled by the downlink control information format, transmitting, to the base station apparatus, the sounding reference signal on the uplink component carrier indicated by the second information in a case that the first information is detected.

According to a second aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, the downlink control information format including first information which instructs to transmit a sounding reference signal and second information which indicates the uplink component carrier in which the physical uplink shared channel is scheduled by the downlink control information format, transmitting, to the base station apparatus, uplink data on the physical uplink shared channel in the uplink component carrier indicated by the second information and the sounding reference signal on the uplink component carrier indicated by the second information in a case that the first information is detected.

According to a third aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, radio resource control signaling including first information which user-equipment-specifically configures positions of subframes for sounding reference signal transmission, receiving, from the base station apparatus, the downlink control information format including second information which instructs to transmit a sounding reference signal, transmitting, to the base station apparatus, the sounding reference signal in the first user-equipment-specifically configured subframe after the second information is detected.

According to a fourth aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, radio resource control signaling including first information which user-equipment-specifically configures positions of subframes for sounding reference signal transmission, receiving, from the base station apparatus, the downlink control information format including second information which instructs to transmit a sounding reference signal, transmitting, to the base station apparatus, uplink data on the physical uplink shared channel scheduled by the downlink control information format including the second information, transmitting, to the base station apparatus, the sounding reference signal in the first user-equipment-specifically configured subframe after the second information is detected.

According to a fifth aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, radio resource control signaling including first information which user-equipment-specifically configures positions of subframes for sounding reference signal transmission, receiving, from the base station apparatus, the downlink control information format including second information which instructs to transmit a sounding reference signal, transmitting, to the base station apparatus, the sounding reference signal in the first user-equipment-specifically configured subframe n' satisfying n'≥n+4 after the second information is detected in subframe n.

According to a sixth aspect of the present invention, a communication method of a user equipment in a mobile communication system in which a base station apparatus schedules a physical uplink shared channel in an uplink component carrier by using a downlink control information format is disclosed. The method comprises receiving, from the base station apparatus, radio resource control signaling including first information which user-equipment-specifically configures positions of subframes for sounding reference signal transmission, receiving, from the base station apparatus, the downlink control information format including second information which instructs to transmit a sounding reference signal, transmitting, to the base station apparatus, uplink data on the physical uplink shared channel scheduled by the downlink control information format including the second information in subframe n+4 after the downlink control information format is detected in subframe n, transmitting, to the base station apparatus, the sounding reference signal in the first user-equipment-specifically configured subframe n' satisfying n'≥n+4 after the second information is detected in subframe n.

According to a seventh aspect of the present invention, a communication method of a base station apparatus in a mobile communication system in which the base station apparatus schedules a physical uplink shared channel in an uplink component carrier by using a downlink control information format is disclosed. The method comprises transmitting, to a user equipment, the downlink control information format including first information which instructs to transmit a sounding reference signal and second information which indicates the uplink component carrier in which the physical uplink shared channel is scheduled by the downlink control information format, receiving, from the user equipment, the sounding reference signal on the uplink component carrier indicated by the second information in a case that the first information is detected by the user equipment.

According to an eighth aspect of the present invention, a communication method of a base station apparatus in a mobile communication system in which the base station apparatus schedules a physical uplink shared channel in an uplink component carrier by using a downlink control information format is disclosed. The method comprises transmitting, to a use equipment, the downlink control information format including first information which instructs to transmit a sounding reference signal and second information which indicates the uplink component carrier in which the physical uplink shared channel is scheduled by the downlink control information format, receiving, from the user equipment, uplink data on the physical uplink shared channel in the uplink component carrier indicated by the second information and the sounding reference signal on the uplink component carrier indicated by the second information in a case that the first information is detected by the user equipment.

According to a ninth aspect of the present invention, a communication method of a base station apparatus in a mobile communication system in which the base station apparatus schedules a physical uplink shared channel in an uplink component carrier by using a downlink control information format is disclosed. The method comprises transmitting, to a user equipment, radio resource control signaling including first information which user-equipment-specifically configures positions of subframes for sounding reference signal transmission, transmitting, to the user equipment, the downlink control information format including second information which instructs to transmit a sounding reference signal, receiving, from the user equipment, the sounding reference signal in the first user-equipment-specifically configured subframe after the second information is detected by the user equipment.

According to a tenth aspect of the present invention, a communication method of a base station apparatus in a mobile communication system in which the base station apparatus schedules a physical uplink shared channel in an uplink component carrier by using a downlink control information format is disclosed. The method comprises transmitting, to a user equipment, radio resource control signaling including first information which user-equipment-specifically configures positions of subframes for sounding reference signal transmission, transmitting, to the user equipment, the downlink control information format including second information which instructs to transmit a sounding reference signal, receiving, from the user equipment, uplink data on the physical uplink shared channel scheduled by the downlink control information format including the second information, receiving, from the user equipment, the sounding reference signal in the first user-equipment-specifically configured subframe after the second information is detected by the user equipment.

According to an eleventh aspect of the present invention, a communication method of a base station apparatus in a mobile communication system in which the base station apparatus schedules a physical uplink shared channel in an uplink component carrier by using a downlink control information format is disclosed. The method comprises transmitting, to a user equipment, radio resource control signaling including first information which user-equipment-specifically configures positions of subframes for sounding reference signal transmission, transmitting, to the user equipment, the downlink control information format including second information which instructs to transmit a sounding reference signal, receiving, from the user equipment, the sounding reference signal in the first user-equipment-specifically configured subframe n' satisfying n'≥n+4 after the second information is detected, by the user equipment, in subframe n.

According to a twelfth aspect of the present invention, a communication method of a base station apparatus in a mobile communication system in which the base station apparatus schedules a physical uplink shared channel in an uplink component carrier by using a downlink control information format is disclosed. The method comprises transmitting, to a user equipment, radio resource control signaling including first information which user-equipment-specifically configures positions of subframes for sounding reference signal transmission, transmitting, to the user equipment, the downlink control information format including second information which instructs to transmit a sounding reference signal, receiving, from the user equipment, uplink data on the physical uplink shared channel scheduled by the downlink control information format including the second information in subframe n+4 after the downlink control information format is detected, by the user equipment, in subframe n, receiving, from the user equipment, the sounding reference signal in the first user-equipment-specifically configured subframe n' satisfying n'≥n+4 after the second information is detected, by the user equipment, in subframe n.

According to a thirteenth aspect of the present invention, an integrated circuit mounted in a user equipment in a mobile communication system in which a base station apparatus schedules a physical uplink shared channel in an uplink component carrier by using a downlink control information format is disclosed. The integrated circuit comprises a logic element for receiving, from the base station apparatus, the downlink control information format including first information which instructs to transmit a sounding reference signal and second information which indicates the uplink component carrier in which the physical uplink shared channel is scheduled by the downlink control information format, a logic element for transmitting, to the base station apparatus, the sounding reference signal on the uplink component carrier indicated by the second information in a case that the first information is detected.

According to a fourteenth aspect of the present invention, an integrated circuit mounted in a user equipment in a mobile communication system in which a base station apparatus schedules a physical uplink shared channel in an uplink component carrier by using a downlink control information format is disclosed. The integrated circuit comprises a logic element for receiving, from the base station apparatus, radio resource control signaling including first information which user-equipment-specifically configures positions of subframes for sounding reference signal transmission, a logic element for receiving, from the base station apparatus, the downlink control information format including second information which instructs to transmit a sounding reference signal, a logic element for transmitting, to the base station apparatus, the sounding reference signal in the first user-equipment-specifically configured subframe after the second information is detected.

According to a fifteenth aspect of the present invention, an integrated circuit mounted in a user equipment in a mobile communication system in which a base station apparatus schedules a physical uplink shared channel in an uplink component carrier by using a downlink control information format is disclosed. The integrated circuit comprises a logic element for receiving, from the base station apparatus, radio resource control signaling including first information which user-equipment-specifically configures positions of subframes for sounding reference signal transmission, a logic element for receiving, from the base station apparatus, the downlink control information format including second information which instructs to transmit a sounding reference signal, a logic element for transmitting, to the base station apparatus, the sounding reference signal in the first user-equipment-specifically configured subframe n' satisfying n'≥n+4 after the second information is detected in subframe n.

According to a sixteenth aspect of the present invention, An integrated circuit mounted in a base station apparatus in a mobile communication system in which the base station apparatus schedules a physical uplink shared channel in an uplink component carrier by using a downlink control information format is disclosed. The integrated circuit comprises a logic element for transmitting, to a user equipment, the downlink control information format including first information which instructs to transmit a sounding reference signal and second information which indicates the uplink component carrier in which the physical uplink shared channel is scheduled by the downlink control information format, a logic element for receiving, from the user equipment, the sounding reference signal on the uplink component carrier indicated by the second information in a case that the first information is detected by the user equipment.

According to a seventeenth aspect of the present invention, an integrated circuit mounted in a base station apparatus in a mobile communication system in which the base station apparatus schedules a physical uplink shared channel in an uplink component carrier by using a downlink control information format is disclosed. The integrated circuit comprises a logic element for transmitting, to a user equipment, radio resource control signaling including first information which user-equipment-specifically configures positions of subframes for sounding reference signal transmission, a logic element for transmitting, to the user equipment, the downlink control information format including second information which instructs to transmit a sounding reference signal, a logic element for receiving, from the user equipment, the sounding reference signal in the first user-equipment-specifically configured subframe after the second information is detected by the user equipment.

According to an eighteenth aspect of the present invention, an integrated circuit mounted in a base station apparatus in a mobile communication system in which the base station apparatus schedules a physical uplink shared channel in an uplink component carrier by using a downlink control information format is disclosed. The integrated circuit comprises a logic element for transmitting, to a user equipment, radio resource control signaling including first information which user-equipment-specifically configures positions of subframes for sounding reference signal transmission, a logic element for transmitting, to the user equipment, the downlink control information format including second information which instructs to transmit a sounding reference signal, a logic element for receiving, from the user equipment, the sounding reference signal in the first user-equipment-specifically configured subframe n' satisfying n'≥n+4 after the second information is detected, by the user equipment, in subframe n.

According to a nineteenth aspect of the present invention, a mobile communication system in which a base station apparatus schedules a physical uplink shared channel in an uplink component carrier by using a downlink control information format is disclosed. The system comprises the base station apparatus transmits, to a user equipment, the downlink control information format including first information which instructs to transmit a sounding reference signal and second information which indicates the uplink component carrier in which the physical uplink shared channel is scheduled by the downlink control information format, the user equipment transmits, to the base station apparatus, the sounding reference signal on the uplink component carrier indicated by the second information in a case that the first information is detected.

According to a twentieth aspect of the present invention, a mobile communication system in which a base station apparatus schedules a physical uplink shared channel in an uplink component carrier by using a downlink control information format is disclosed. The system comprises the base station apparatus transmits, to a use equipment, radio resource control signaling including first information which user-equipment-specifically configures positions of subframes for sounding reference signal transmission, transmits, to the use equipment, the downlink control information format including second information which instructs to transmit a sounding reference signal, the user equipment transmits, to the base station apparatus, the sounding reference signal in the first user-equipment-specifically configured subframe after the second information is detected.

According to a twenty-first aspect of the present invention, a mobile communication system in which a base station apparatus schedules a physical uplink shared channel in an uplink component carrier by using a downlink control information format is disclosed. The system comprises the base station apparatus transmits, to a use equipment, radio resource control signaling including first information which user-equipment-specifically configures positions of subframes for sounding reference signal transmission, transmits, to the user equipment, the downlink control information format including second information which instructs to transmit a sounding reference signal, the user equipment transmits, to the base station apparatus, the sounding reference signal in the first user-equipment-specifically configured subframe n' satisfying n'≥n+4 after the second information is detected in subframe n.

According to the present invention, the base station may perform flexible transmission control for the SRS transmission, thus leading to more efficient transmission control (scheduling) between the base station and the user equipment.

BRIEF DESCRIPTION OF THE DRAWINGS

FIG. 1 is a schematic diagram illustrating a signaling communication flow according to the present invention.

FIG. 3 is a schematic diagram illustrating a method for scheduled SRS transmission according to the first embodiment of the present invention.

FIG. 4 is a schematic diagram illustrating a method for scheduled SRS transmission according to the second embodiment of the present invention.

DESCRIPTION OF EMBODIMENTS

Figure 2:
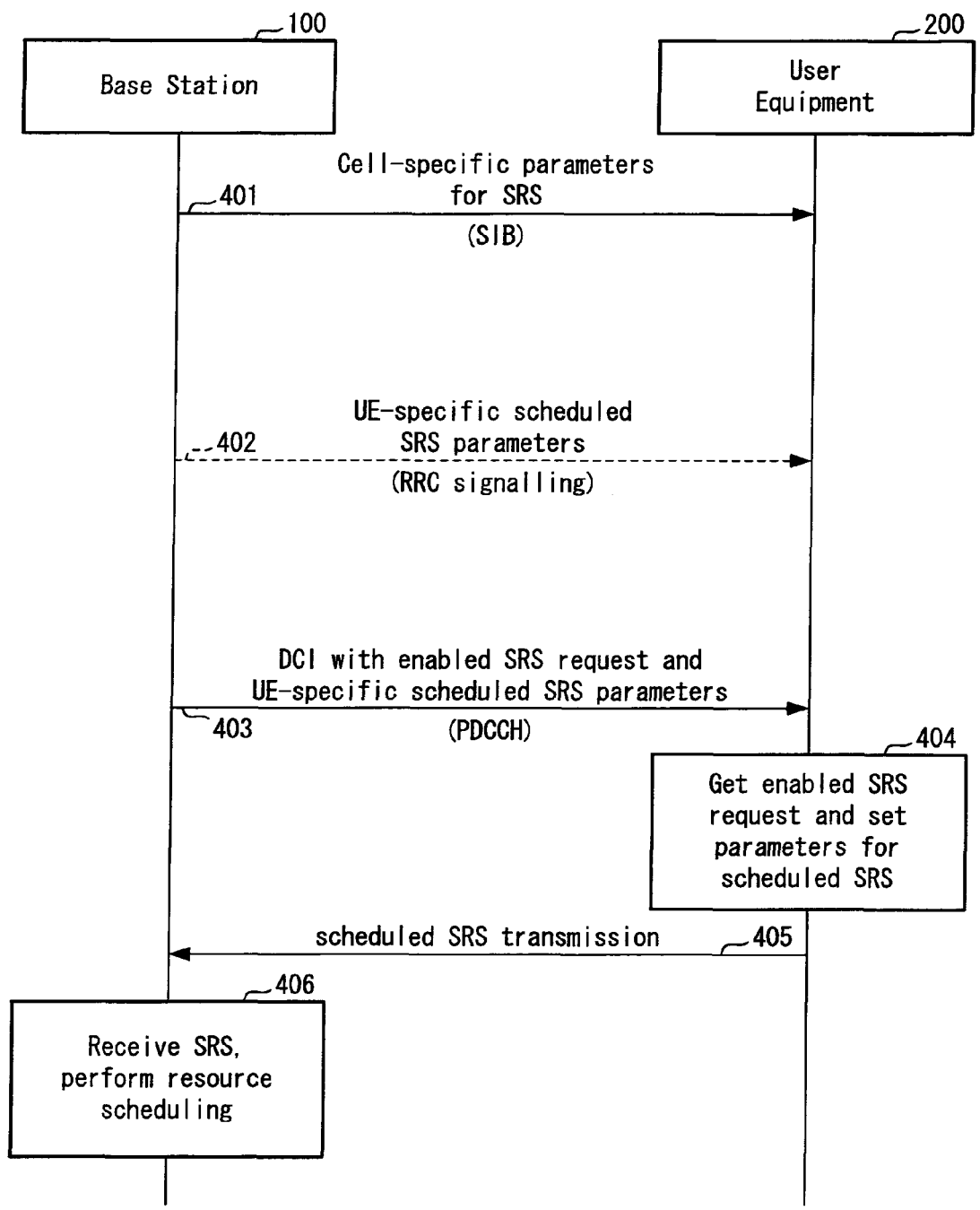
FIG. 2 is a schematic diagram illustrating another signaling communication flow according to the present invention.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

According to the present invention, a communication method for sounding reference signal (SRS) transmission in a wireless communication system mainly aims for scheduled SRS transmission (mentioned in above Non-Patent Document 2).

The communication method according to the present invention comprises the following basic steps: (I) a base station (BS) configures SRS (sounding reference signal) parameters to a user equipment (UE); (II) the BS transmits an uplink transmission permission signal including information for instructing transmission of SRS and (III) the UE transmits scheduled SRS information according to the received SRS parameters after receiving the information for instructing transmission of SRS.

FIG. 1 is a schematic diagram illustrating one signaling communication flow for SRS transmission according to the present invention.

As shown in FIG. 1, a signaling communication flow for SRS transmission according to the present invention comprises the following steps. A base station (BS) 100 cell-specifically configures to a user equipment 200 parameters for SRS transmission by using, for example, broadcast channel (Step 301). For example, the BS assigns the parameters to the UE via System Information Block (SIB) mapped to DL-SCH (downlink shared channel). The cell-specifically configured parameters in the present invention include SRS bandwidth, SRS subframes (e.g. positions), and antennas for the SRS transmission or any other information on SRS. These cell-specific parameters designate time-frequency resources (such as the SRS bandwidth and the SRS subframes) on which the user equipment dominated by the base station is able to send the SRS. The cell-specific parameters may include periodic and/or scheduled SRS information.

The base station further UE-specifically configures to the user equipment parameters for the scheduled SRS transmission by using, for example, RRC signaling (Radio Resource Control signaling) (Step 302). The UE-specifically configured parameters in the present invention include transmission comb (frequency offset for calculating the starting frequency domain position of SRS), SRS subframe offset, SRS bandwidth, cyclic shift (3 bits for SRS sequence generation), etc. After receiving the above cell-specific and UE-specific parameters, the user equipment sets the parameters needed for scheduled SRS transmission (Step 303). In an alternative example, the base station further assigns to the user equipment resources for the scheduled SRS transmission by using the RRC signaling so that the user equipment transmits the scheduled SRS by using the resources assigned by the RRC signaling to the base station.

At Step 304, the base station transmits an uplink transmission permission signal (UL_grant) for instructing the SRS transmission (the scheduled SRS transmission) to the user equipment. For example, the base station instructs the SRS transmission by using an indicator (hereinafter, SRS request) included as DCI (Downlink Control Information, which can be transmitted by a Downlink Control Information Format) of the uplink transmission permission signal to the user equipment. The DCI includes resource assignment for PUSCH of uplink data transmission. In other words, the base station transmits to the user equipment the uplink transmission permission signal including information (hereinafter, enabled SRS request) for instructing the scheduled SRS transmission. For example, the base station transmits to the user equipment the uplink transmission permission signal dynamically (e.g., per 1 ms) to trigger (instruct) the scheduled SRS transmission.

After receiving the uplink transmission permission signal, especially after receiving the information for instructing the scheduled SRS transmission (Step 305), the user equipment transmits the scheduled SRS to the base station according to the parameters which are configured cell-specifically and/or UE-specifically (Step 306). In an alternative example, the user equipment transmits the scheduled SRS to the base station by using resources assigned by the base station through the RRC signaling. After receiving the scheduled SRS on designated resources, the base station estimates uplink channel state of the user equipment, and schedules wireless resources (e.g., assignment of PUSCH resources, modulation and coding) (Step 307).

It is to be noted that FIG. 1 only shows one example of the signal communication procedure between the base station and user equipment. In an alternative example, the base station may cell-specifically configure periodic SRS parameters and/or scheduled SRS parameters to the user equipment, or the base station may UE-specifically configure the periodic SRS parameters and/or scheduled SRS parameters to the user equipment. Thus, in the SRS transmission method according to the present invention, the scheduled SRS parameter configuration may only adopt Step 301 (or Step 302) or both Step 301 and Step 302 for different communication environments.

FIG. 2 is a schematic diagram illustrating another signaling communication flow for SRS transmission according to the present invention.

As shown in FIG. 2, the base station cell-specifically configures to the user equipment parameters for SRS transmission by using broadcast channel (e.g., SIB) (Step 401). The parameters for SRS transmission may include parameters for periodic SRS transmission and/or scheduled SRS transmission. Similar to the explanation of FIG. 1, the base station may cell-specifically configure to the user equipment the parameters which include SRS bandwidth, SRS subframes and antennas for the SRS transmission.

The base station UE-specifically configures to the user equipment parameters for the scheduled SRS transmission by using the RRC signaling (Step 402). In FIG. 2, Step 402 is indicated by dotted line, since Step 402 may be omitted if the base station has cell-specifically configured parameters for the scheduled SRS transmission to the user equipment in Step 401. The UE-specifically configured parameters in Step 402 include, for example, the transmission comb (frequency offset for calculating the starting frequency domain position of SRS), SRS subframe offset, SRS bandwidth and cyclic shift (3 bits for SRS sequence generation). It is noted that in the present example the RRC signaling sent by the base station acts as a complement for the parameter configuration. In the example shown in FIG. 2, the base station UE-specifically configures to the user equipment initial parameters for the scheduled SRS transmission by using RRC signaling. For example, the base station transmits to the user equipment the RRC signaling including the parameters for the scheduled SRS transmission as an initial configuration.

The base station further transmits to the user equipment an uplink transmission permission signal including an enabled SRS request (Step 403). In FIG. 2, the DCI included in the uplink transmission permission signal is the information for the scheduled SRS transmission and the base station UE-specifically configures to the user equipment the parameters for the scheduled SRS transmission by using the uplink transmission permission signal. In other words, by using the uplink transmission permission signal, the base station reconfigures to the user equipment the UE-specific parameters which are configured by the RRC signaling in Step 402. Similarly, the base station may further assign the resources for the scheduled SRS transmission to the user equipment by using the uplink transmission permission signal.

It is noted that in an alternative example the base station may only configure the UE-specific parameters to the user equipment by using the uplink transmission permission signal without configuring SRS parameter through RRC signaling in advance.

After receiving the uplink transmission permission signal, the user equipment sets the parameters needed for scheduled SRS transmission according to the reconfigured SRS parameters from the base station (Step 404).

The user equipment transmits the scheduled SRS to the base station according to the parameters which are (re)configured by using the uplink transmission permission signal (Step 405). In the present example in FIG. 2, the user equipment transmits the scheduled SRS to the base station by using the resources assigned by, for example, the uplink transmission permission signal. After receiving the scheduled SRS on the designated resources, the base station estimates uplink channel state of the user equipment, and schedules the wireless resources (e.g., assignment of PUSCH resources, modulation, and coding) (Step 406).

In alternative implementations of FIG. 2, the base station may reconfigure UE-specific parameters more times, and the user equipment will use the latest reconfigured parameters for SRS transmission. Moreover, the base station may cell-specifically configure periodic SRS parameters and/or scheduled SRS parameters to the user equipment, or the base station may UE-specifically configure the periodic SRS parameters and/or scheduled SRS parameters to the user equipment.

Following embodiments will be described based on the signaling procedure in FIG. 1 or FIG. 2, however, it will be understood that following examples are also able to adopt any one of above SRS signaling procedures and variations for implementing the SRS transmission.

First Embodiment

FIG. 3 is a schematic diagram explaining an SRS communication method for a mobile communication system with aggregated multiple component carriers according to the first embodiment of the present invention.

As shown in FIG. 3, in subframe n, the base station configures to the user equipment two downlink component carriers (DL CC1, DL CC2) and two uplink component carriers (UL CC1, UL CC2) for communications. In this embodiment, the base station configures to the user equipment the number of the downlink component carriers in the DL by using the RRC signaling. Similarly, the base station also configures to the user equipment the uplink component carriers in the UL by using the RRC signaling. Accordingly, the base station and the user equipment communicate on frequency bandwidth with these two aggregated DL CCs/UL CCs as shown in FIG. 3. Then, the base station configures parameters for scheduled SRS to the user equipment (see, for example, Step 301 and Step 302 in FIG. 1).

After receiving SRS parameter, the user equipment sets the parameters (see, for example, Step 303 in FIG. 1).

The base station transmits to the user equipment the DCI on PDCCH including the CI which indicates the scheduled PDSCH or scheduled PUSCH. In details, the base station assigns to the user equipment the PDSCH resources on respective component carrier according to the CI included in the DCI on PDCCH for the downlink, and the base station assigns to the user equipment the PUSCH resources on respective component carrier according to the CI included in the DCI on PDCCH for the uplink as the uplink transmission permission signal.

As shown in the example of FIG. 3, in subframe n, the base station transmits to the user equipment the DCI on PDCCH as a first uplink transmission signal which indicates the PUSCH resources on the UL CC1 (represented by an oblique line block). In the same subframe n, the base station transmits to the user equipment the DCI on PDCCH as a second uplink transmission permission signal which indicates the PUSCH resources on the UL CC2 (represented by a horizontal line block) (see, for example, Step 304 in FIG. 1).

After receiving the first and second uplink transmission permission signals (see, for example, Step 305 in FIG. 1), the user equipment transmits to the base station the uplink data (transport block for UL-SCH (UL-Shared Channel)) by using the PUSCH resources on respective component carrier assigned by respective uplink transmission permission signal.

In the present embodiment, the user equipment transmits to the base station the uplink data using the PUSCH resources (represented by an oblique line block) on the UL CC1 assigned by the first uplink transmission permission signal in subframe #n+t. In the same subframe #n+t, the user equipment also transmits to the base station the uplink data using the PUSCH resources (represented by a horizontal line block) on the UL CC2 assigned by the second uplink transmission permission signal.

In the present embodiment, the base station transmits to the user equipment the first uplink transmission permission signal including the enabled SRS request (i.e., SRS request=1) which enables the scheduled SRS transmission. Accordingly, the user equipment transmits to the base station the scheduled SRS on the UL CC1 according to the CI included in the first uplink transmission permission signal. In other words, the user equipment transmits to the base station the scheduled SRS on an UL CC (UL CC1) identical with the UL CC1 on which the PUSCH is assigned by the first uplink transmission permission signal. Similarly, since the base station assigns to the user equipment the PUSCH resources on the UL CC2 by using the second uplink transmission permission signal with the enabled SRS request, the UE transmits to the base station the scheduled SRS on the UL CC2 according to CI included in the second uplink transmission permission signal (see, for example, Step 306 in FIG. 1). Finally, the base station will receive the uplink data and scheduled SRS (see, for example, Step 307 in FIG. 1). In present embodiment, the base station performs cross-carrier scheduling (scheduling over the component carriers).

In one example of the present embodiment, the base station assigns to the user equipment the resources for the scheduled SRS transmission by using the RRC signaling. In such case, the user equipment transmits to the base station the scheduled SRS by using the resources assigned by the RRC signaling together with the uplink data by using PUSCH resources assigned by the uplink transmission permission signal.

In the above example, the user equipment transmits the SRS information to the base station in the same subframe. It is noted that in an alternative example, the user equipment may transmit the scheduled SRS after sending the uplink data, if the scheduled resource for SRS transmission is assigned after the scheduled resource for uplink data transmission. In other words, according to the resource assignment, the user equipment transmits the uplink data in a first subframe and transmits the scheduled SRS in a second subframe. The second subframe is a following subframe after the first subframe.

In the embodiment shown in FIG. 3, the base station assigns the PUSCH resources to the user equipment by using the uplink transmission permission signal including the CI. In the case that the enabled SRS request (SRS request=1) is included in that uplink transmission permission signal, the user equipment transmits to the base station the scheduled SRS on the UL CC identical with the UL CC on which the PUSCH is assigned by the uplink transmission permission signal. In other words, the base station transmits to the user equipment the uplink transmission permission signal including CI for indicating the uplink component carrier on which the PUSCH is assigned by the uplink transmission permission signal, and the user equipment transmits the scheduled SRS to the base station according to the PUSCH assignment in the uplink transmission permission signal from the base station. Therefore, it is not necessary to add additional information for indicating the UL CC for the scheduled SRS transmission, and the base station may achieve more efficient scheduling. For example, the base station instructs the user equipment to transmit the scheduled SRS transmission without additional information in the uplink transmission permission signal, which does not introduce any additional information indicating the uplink component carrier for the scheduled SRS transmission. Based on the instruction the user equipment transmits to the base station the scheduled SRS on wider bandwidth with aggregated uplink component carriers.

It is noted that in an alternative example, more uplink transmission permission signals may be used according to the component carrier scheduling.

As described, according to the first embodiment of the present invention, the base station may transmit to the user equipment the uplink transmission permission signal including the SRS request. In case that the enabled SRS request is included in the uplink transmission permission signal, the user equipment may transmit the scheduled SRS to the base station. During scheduled SRS transmission, the user equipment may transmit to the base station the scheduled SRS according to the PUSCH assignment from the base station. Hereby, the base station may instruct to the user equipment the scheduled SRS transmission with flexibility. Since the base station instructs to the user equipment the scheduled SRS transmission by using the uplink transmission permission signal, it is possible to instruct the scheduled SRS transmission dynamically and immediately. On the other hand, since the user equipment transmits the scheduled SRS to the base station according to the PUSCH assignment, the user equipment may transmit to the base station the scheduled SRS on the wider transmission bandwidth efficiently. Moreover, since the base station may instruct the user equipment to transmit the scheduled SRS on the UL CC identical with the UL CC on which the PUSCH is assigned by the uplink transmission permission signal, more efficient instruction may be achieved considering the wider transmission bandwidth.

Second Embodiment

FIG. 4 is a schematic diagram illustrating a method for scheduled SRS transmission according to the second embodiment of the present invention.

The present embodiment may adopt any one of above SRS signaling procedures (shown in FIG. 1 and FIG. 2) and their variations for implementing the SRS transmission.

In this embodiment of the present invention, the base station transmits to the user equipment the uplink transmission permission signal including the enabled SRS request. In case that the enabled SRS request is included in the uplink transmission permission signal, the user equipment transmits the uplink data to the base station by using the PUSCH assigned by the uplink transmission permission signal and the scheduled SRS in the same subframe.

In the present embodiment, the base station cell-specifically configures to the user equipment the SRS subframes by using the broadcast channel (e.g., SIB). As shown in FIG. 4, the base station configures to the user equipment subframes #n−2, #n, #n+2, #n+4, #n+6, #n+8, #n+10, #n+12 and #n+14 (e.g., subframe positions) as the SRS subframes. These allocated subframes may be used for periodic SRS transmission and/or scheduled SRS transmission. Alternatively, the base station may UE-specifically assign to the user equipments the resources for the periodic SRS transmission by using the RRC signaling.

In FIG. 4, the user equipment transmits the periodic SRS (shown by vertical line) to the base station in the subframes #n−2, #n+2, #n+6, #n+10 and #n+14. The user equipment transmits the periodic SRS to the base station in the subframes among the SRS subframes cell-specifically configured by the base station.

Referring to the signaling procedure shown in FIG. 1, in the subframe #n, the base station transmits to the user equipment the uplink transmission permission signal including the enabled SRS request. After receiving this uplink transmission permission signal, the user equipment transmits the uplink data (represented by a grid block) and the scheduled SRS (represented by a horizontal line block) to the base station in the same subframe.

In FIG. 4, it is shown that the user equipment transmits the uplink data and the scheduled SRS to the base station in the subframe #n+4. According to the requirement of real systems, the user equipment needs some time to decode (and detect) the DCI (the uplink transmission permission signal). As a result, there is a delay (e.g. 4 subframes) of the UL data transmission, which is the minimum time for UE's action after receiving the control signal. In the present embodiment, the uplink data and scheduled SRS may be transmitted in the dedicated subframe #n+K, where K is a positive integer, e.g., K is set to 4 in FDD (Frequency Division Duplexing) system.

In FIG. 4, the user equipment transmits the uplink data to the base station by using the PUSCH resources in the subframe #n+4 after the downlink control information format is detected in subframe n. At the same timing, the user equipment transmits the scheduled SRS to the base station. Here, the PUSCH resources for the uplink data transmission are assigned by the base station through the uplink transmission permission signal. The resources for the scheduled SRS transmission are assigned by the base station through the RRC signaling. The base station assigns resources to the user equipment from the cell-specifically configured SRS resources by using the broadcast channel (e.g., SIB).

In the embodiment of FIG. 4, the base station may cell-specifically configure to the user equipment the SRS subframes for the periodic SRS transmission. The base station may cell-specifically assign to the user equipment the SRS resource for the periodic SRS and/or the scheduled SRS transmission. The base station may UE-specifically assign to the user equipment the resources for the periodic SRS from the SRS resources. The base station may UE-specifically assign the resources for the scheduled SRS to the user equipment from the SRS resources. The user equipment may transmit the periodic SRS to the base station according to the resources for the periodic SRS transmission. The user equipment may transmit the scheduled SRS to the base station according to the resources for the scheduled SRS transmission and the uplink transmission permission signal including the enabled SRS request. The parameters for the periodic SRS transmission and the scheduled SRS transmission may be cell-specifically and/or UE-specifically configured by the base station by using the broadcast channel (e.g., SIB) and/or the RRC signaling.

Third Embodiment

Figure 5:
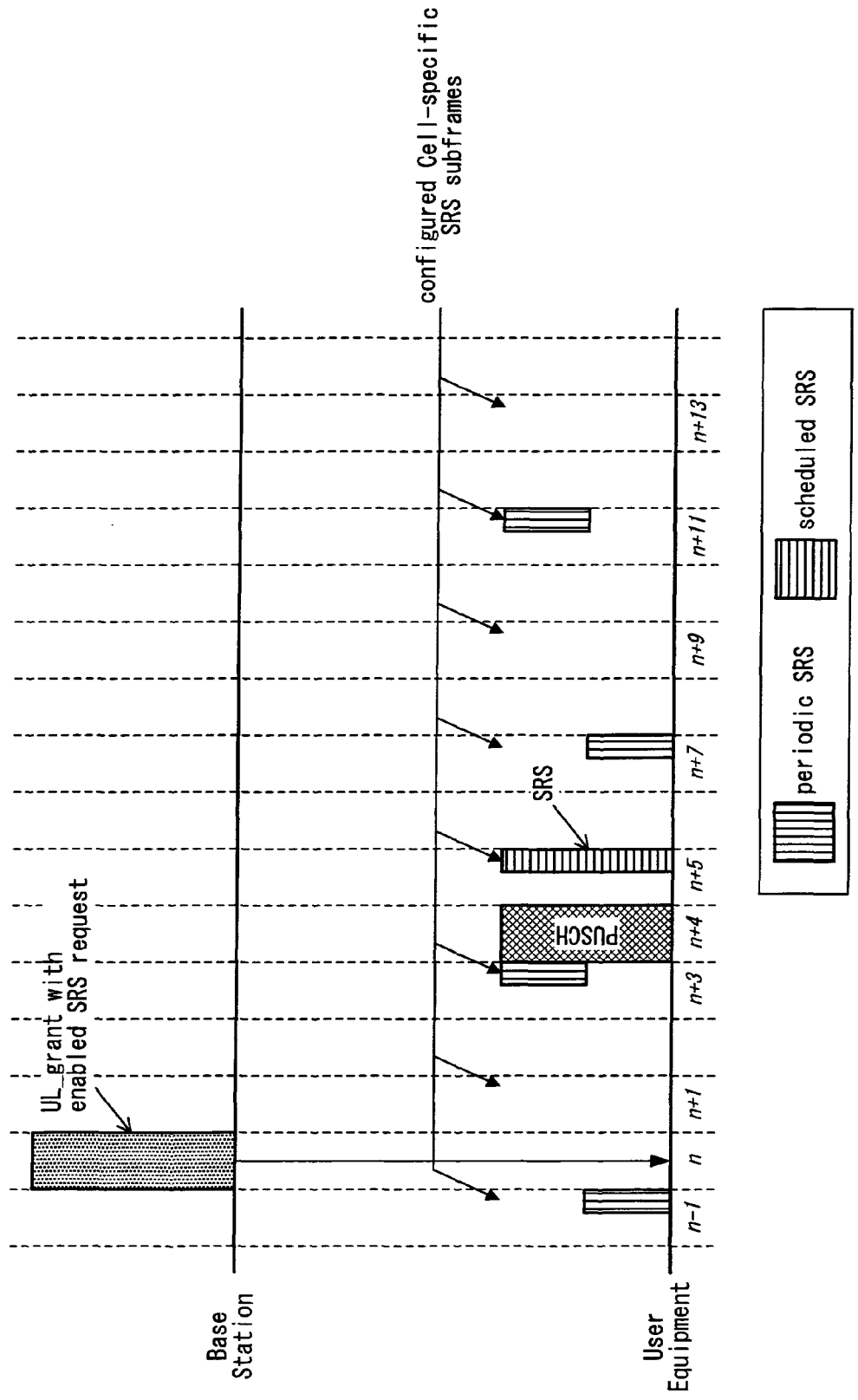
FIG. 5 is a schematic diagram illustrating a method for scheduled SRS transmission according to the third embodiment of the present invention.

FIG. 5 is a schematic diagram illustrating a method for scheduled SRS transmission according to the third embodiment of the present invention.

In this embodiment of the present invention, the base station transmits the uplink transmission permission signal including the enabled SRS request to the user equipment. In case that the enabled SRS request is included in the uplink transmission permission signal, the user equipment transmits, in a first subframe (subframe #n+4), the uplink data to the base station by using the PUSCH assigned by the uplink transmission permission signal, and transmits, in a second (following) subframe (subframe #n+5), the scheduled SRS to the base station. The resources for the scheduled SRS transmission is assigned by the base station, for example, through the RRC signaling. In the present embodiment, the base station cell-specifically configures to the user equipment positions of the subframes as the SRS subframes.

Similar to the second embodiment in FIG. 4, the base station may cell-specifically configure to the user equipment the SRS subframes by using the broadcast channel (e.g., SIB). In FIG. 5, it is shown that the base station configures to the user equipment subframes #n−1, #n+1, #n+3, #n+5, #n+7, #n+9, #n+11 and #n+13 as the SRS subframes. Furthermore, the base station may UE-specifically assign to the user equipment the resources for the periodic SRS transmission by using the RRC signaling. In FIG. 5, the user equipment transmits the periodic SRS (represented by a vertical line block) to the base station in the subframes #n−1, #n+3, #n+7 and #n+11.

As shown in FIG. 5, the base station transmits to the user equipment the uplink transmission permission signal including the enabled SRS request in the subframe #n. After receiving this uplink transmission permission signal, the user equipment transmits the uplink data (represented by a grid block) to the base station in the subframe #n+4 by using the PUSCH resources assigned by the uplink transmission permission signal, because the user equipment needs some time for response. In the present embodiment, the user equipment may transmit to the base station the uplink data in the subframe #n+K, where K is an integer and K is set to 4 in FDD system.

The user equipment transmits, in a following subframe #n+5, the scheduled SRS (represented by a horizontal line block) to the base station by using the resources assigned through the RRC signaling by base station. In the present embodiment, the subframe #n+5 is one of the SRS subframes cell-specifically configured by the base station by using the broadcast channel (e.g., SIB).

In the present embodiment, the user equipment transmits the scheduled SRS to the base station in a subframe which is the latest cell-specifically configured SRS subframe after the subframe for the PUSCH transmission (uplink data transmission). As a result, the user equipment transmits the scheduled SRS to the base station in the subframe #n+K' (or n'), where K'≥K, K' and K are integers and K is set to 4 in FDD system. In other words, in the present embodiment, the user equipment shall postpone the scheduled SRS transmission to the next available cell-specifically configured SRS subframe for the SRS transmission. The next available cell-specifically configured SRS subframe is an adjacent subframe for the sounding reference signal transmission after the PUSCH transmission subframe. Please note that in the present embodiment the adjacent subframe (#n+5) for the sounding reference signal transmission after the PUSCH transmission subframe is a subframe directly following the PUSCH transmission subframe (#n+4), however, in different communication environment, if a following subframe (#n+6) is the adjacent subframe for SRS transmission after PUSCH transmission subframe (#n+4), the user equipment will transmit the scheduled SRS to the base station in the following subframe (#n+6).

Similar to the second embodiment, in FIG. 5, the parameters for the periodic SRS transmission and the scheduled SRS transmission may be cell-specifically and/or UE-specifically by the base station by using the broadcast channel (e.g., SIB) and/or the RRC signaling. In a variation embodiment, the user equipment may postpone the scheduled SRS transmission to the next available UE-specifically configured SRS subframe for the SRS transmission.

Fourth Embodiment

Figure 6:
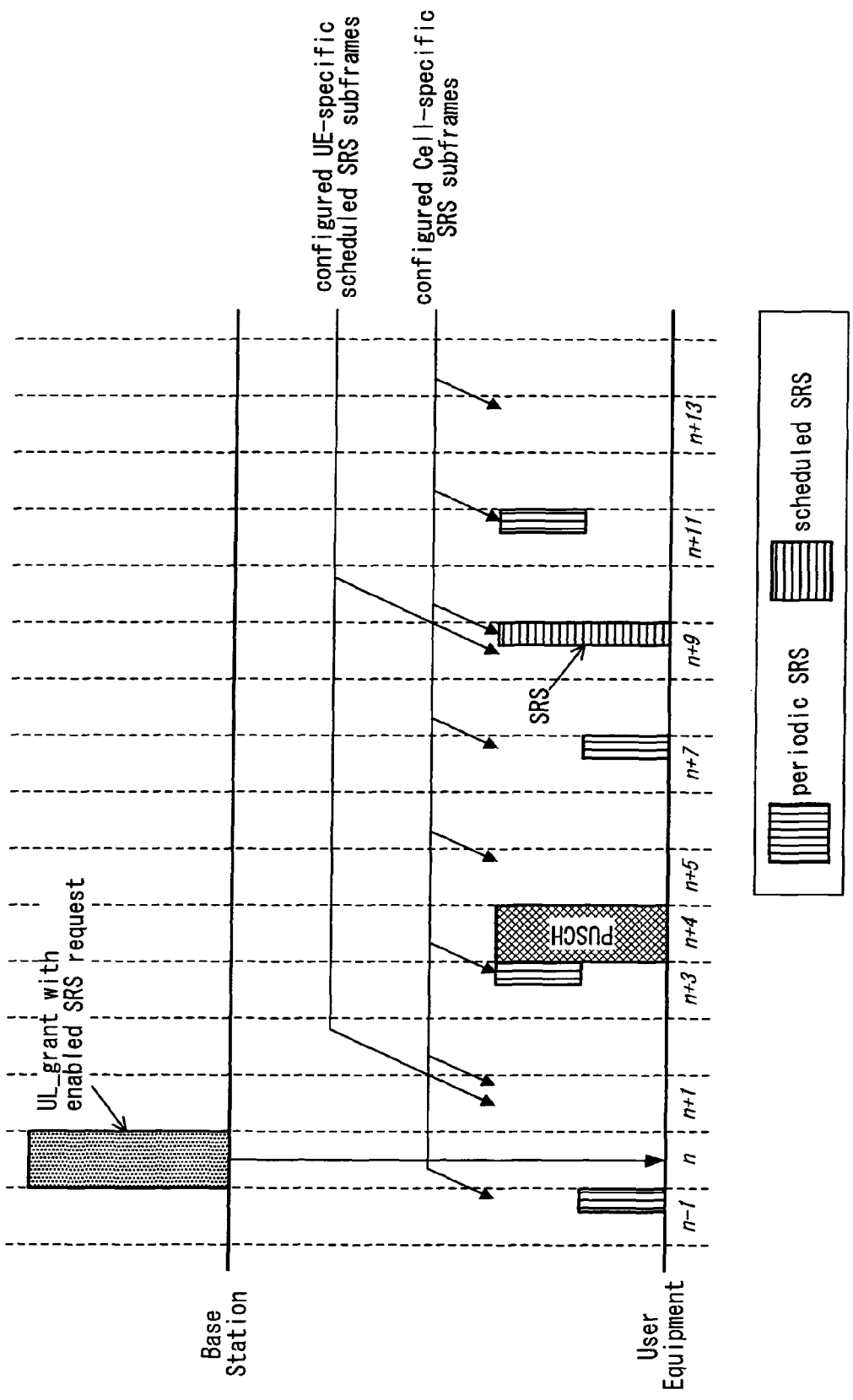
FIG. 6 is a schematic diagram illustrating a method for scheduled SRS transmission according to the fourth embodiment of the present invention.

FIG. 6 is a schematic diagram illustrating a method for scheduled SRS transmission according to the fourth embodiment of the present invention.

The base station transmits the uplink transmission permission signal including the enabled SRS request to the user equipment. In case that the enabled SRS request is included in the uplink transmission permission signal, the user equipment transmits, in a first subframe (subframe #n+4), to the base station the uplink data through the PUSCH assigned by the uplink transmission permission signal, and transmits the scheduled SRS to the base station in a second (following) subframe (subframe #n+9). Here, the resources for the scheduled SRS transmission are assigned by the base station through the RRC signaling. In details, the base station UE-specifically configures to the user equipment positions of the second subframe as scheduled SRS subframes. The scheduled SRS subframes are selected from the SRS subframes cell-specifically configured by the base station through the broadcast channel (e.g., SIB).

In the present embodiment, the base station cell-specifically configures to the user equipment the SRS subframes by using the broadcast channel (e.g., SIB). As shown in FIG. 6, the base station configures to the user equipment subframes #n−1, #n+1, #n+3, #n+5, #n+7, #n+9, #n+11 and #n+13 as the SRS subframes (including periodic SRS subframes and scheduled SRS subframes). Furthermore, the base station may UE-specifically assign to the user equipment the resources for the periodic SRS transmission by using the RRC signaling. In FIG. 6, after SRS parameters configuration, the user equipment transmits the periodic SRS (represented by a vertical line block) to the base station in the subframes #n−1, #n+3, #n+7 and #n+11.

In the present embodiment, the base station further UE-specifically configures to the user equipment the scheduled SRS subframes by using the RRC signaling. In FIG. 6, it is shown that the base station configures to the user equipment subframes #n+1 and #n+9 as the scheduled SRS subframes. In the present embodiment, the base station configures to the user equipment the scheduled SRS subframes from the SRS subframes cell-specifically configured by using the broadcast channel (e.g., SIB). In an alternative example, the base station may UE-specifically assign to the user equipment other resources different from above assigned resources for the scheduled SRS transmission by using the RRC signaling.

In FIG. 6, the base station transmits to the user equipment the uplink transmission permission signal including the enabled SRS request in the subframe #n. After receiving this uplink transmission permission signal, the user equipment transmits, in the subframe #n+4, the uplink data (represented by a hatching block) to the base station using the PUSCH resources assigned by the uplink transmission permission signal. Then, the user equipment transmits, in the following subframe #n+9, the scheduled SRS (represented by a horizontal line block) to the base station using the resources assigned by the RRC signaling. Here, the following subframe #n+9 is one of the scheduled SRS subframes UE-specifically configured by the base station by using the RRC signaling. Namely, the user equipment transmits the uplink data to the base station in the subframe #n+K, where K is an integer and K is set to 4 in FDD system. Moreover, the user equipment transmits the scheduled SRS to the base station in a subframe which is the latest configured UE-specific scheduled SRS subframe after the subframe for the PUSCH transmission. The latest configured UE-specific scheduled SRS subframe is an adjacent subframe for the scheduled sounding reference signal transmission after the PUSCH transmission subframe.

In the present embodiment, the user equipment transmits the scheduled SRS to the base station in the subframe #n+K' (or n'), where K'≥K, K' and K are integers and K is set to 4 in FDD system. The user equipment will postpone the scheduled SRS transmission to the next available UE-specifically configured SRS subframe for the scheduled SRS, which is a following subframe after the uplink data transmission subframe. Similar to the second and third embodiments, in the embodiment shown in FIG. 6, the parameters for the periodic SRS transmission and the scheduled SRS transmission may be cell-specifically and/or UE-specifically configured by the base station by using the broadcast channel (e.g., SIB) and/or the RRC signaling.

Fifth Embodiment

Figure 7:
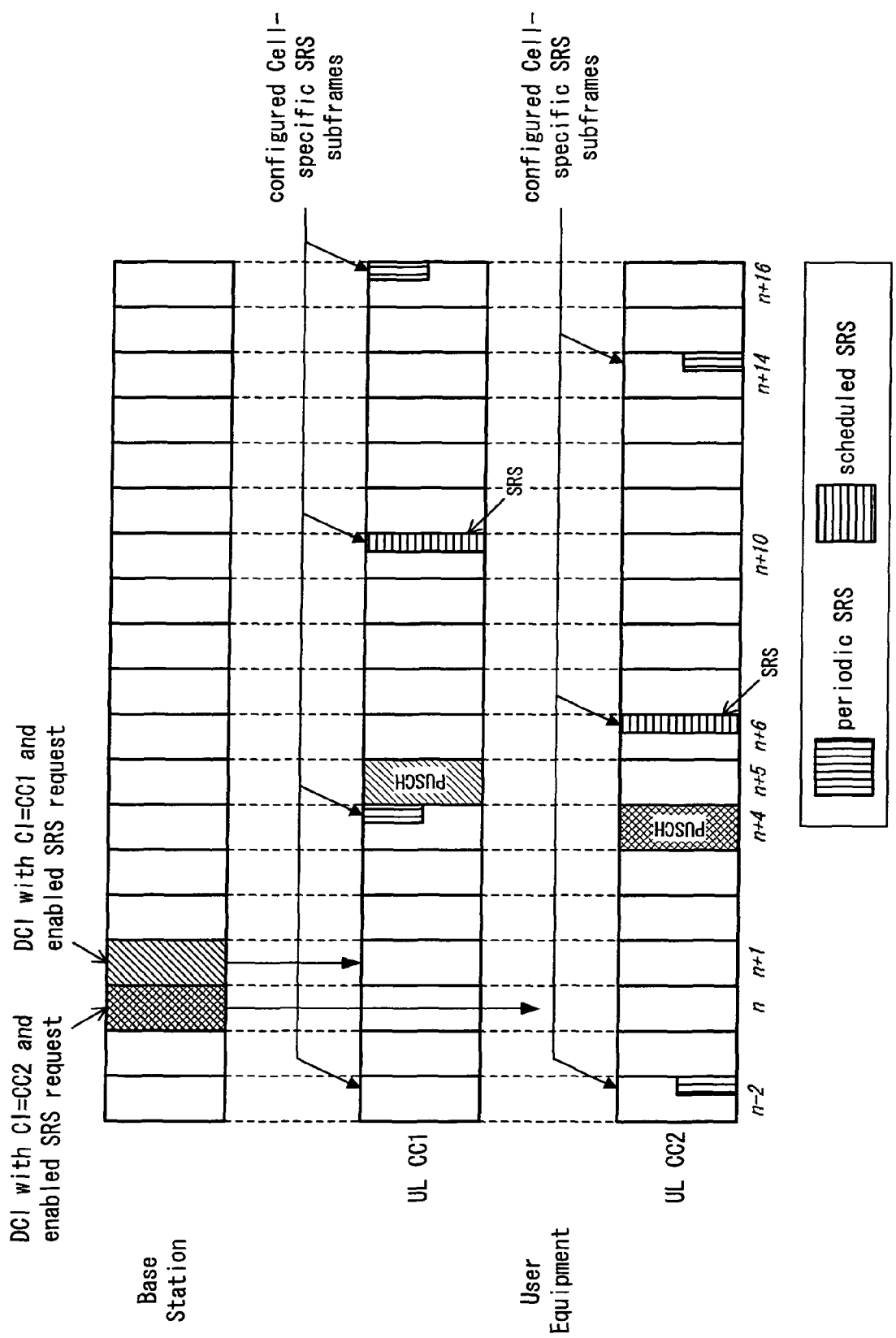
FIG. 7 is a schematic diagram illustrating a method for scheduled SRS transmission according to the fifth embodiment of the present invention.

FIG. 7 is a schematic diagram illustrating scheduled SRS transmission according to the fifth embodiment of the present invention.

In this embodiment of the present invention, the base station sets to the user equipment respective position of subframes for the scheduled SRS transmission per component carrier, so the user equipment will transmit to the base station the scheduled SRS on respective UL component carrier according to respective position of subframes configured by the base station.

It is noted that above second, third and fourth embodiment may apply to not only single UL CC scenario but also multiple UL CC scenario; on the other hand, the first embodiment is able to extend to the scenarios shown in FIG. 4-FIG. 6 easily. The present embodiment will explain a general scenario considering the combination of FIG. 3 and FIG. 5. According to the present embodiment, the skill in the art may also be able to apply mechanism of FIG. 3 to FIG. 4 and FIG. 6 easily.

In the present embodiment, the SRS parameters for the subframes including the SRS subframes and the scheduled SRS subframes and the SRS parameters for each component carrier are configured in the same way as those mentioned in FIG. 3 and FIG. 5.

As shown in FIG. 7, the base station transmits to the user equipment a first uplink transmission permission signal including the enabled SRS request for the UL CC 2 (CI=CC2) in the subframe #n, and transmits to the user equipment a second uplink transmission permission signal including the enabled SRS request for the UL CC 1 (CI=CC1) in the subframe #n+1.

After receiving the first and second uplink transmission permission signals, the user equipment transmits the uplink data to the base station in the subframe #n+4 by using the PUSCH resources on UL CC2, and transmits the scheduled SRS (represented by a horizontal line block) in a following subframe #n+6 which is the latest SRS subframe after the subframe (#n+4) for the PUSCH transmission by using assigned SRS resources on UL CC2. The user equipment also transmits the uplink data to the base station in the subframe #n+5 by using the PUSCH resources on UL CC1, and transmits the scheduled SRS (represented by a horizontal line block) in a following subframe #n+10 which is the latest SRS subframe after the subframe (#n+5) for the PUSCH transmission by using assigned SRS resources on UL CC1.

Referring to the explanation in FIG. 3, the user equipment transmits the scheduled SRS to the base station on the UL CC identical with the UL CC on which the PUSCH is assigned by the uplink transmission permission signal. In details, the user equipment transmits the scheduled SRS to the base station on respective UL component carrier according to the PUSCH assignment by respective uplink transmission permission signal.

It is noted that in present embodiment the base station sends two uplink transmission permission signals to the user equipment, however, in a variation example, the base station may send more uplink transmission permission signals to the user equipment according to the SRS parameter configuration and requirements of the communication system.

As described above, according to any one of the second-fifth embodiments of the present invention, the base station may configure to the user equipment the subframes (e.g., positions) for the scheduled SRS transmission, and the user equipment may transmit the scheduled SRS to the base station in the configured SRS subframes. Since the base station may configure to the user equipment the subframes for the scheduled SRS transmission, it is possible to avoid the interferences of user equipments within the cell.

According to the present invention, the base station may configure to respective user equipment the subframes for the PUSCH transmission and the subframes for the scheduled SRS transmission. Therefore, it is possible to avoid the collision between the PUSCH transmission and the scheduled SRS transmission, and the interferences within the cell may be decreased. Moreover, it is possible for the base station to perform more efficient transmission control (scheduling) without causing the interference in the cell.

(Mobile Communication System)

In the following descriptions, a mobile communication system according to the present invention will be described. The mobile communication system includes a base station and a user equipment and the base station and user equipment may communicate with each other according to the method for SRS transmission (especially scheduled SRS transmission) in any above embodiment or its variation example.

Figure 8:
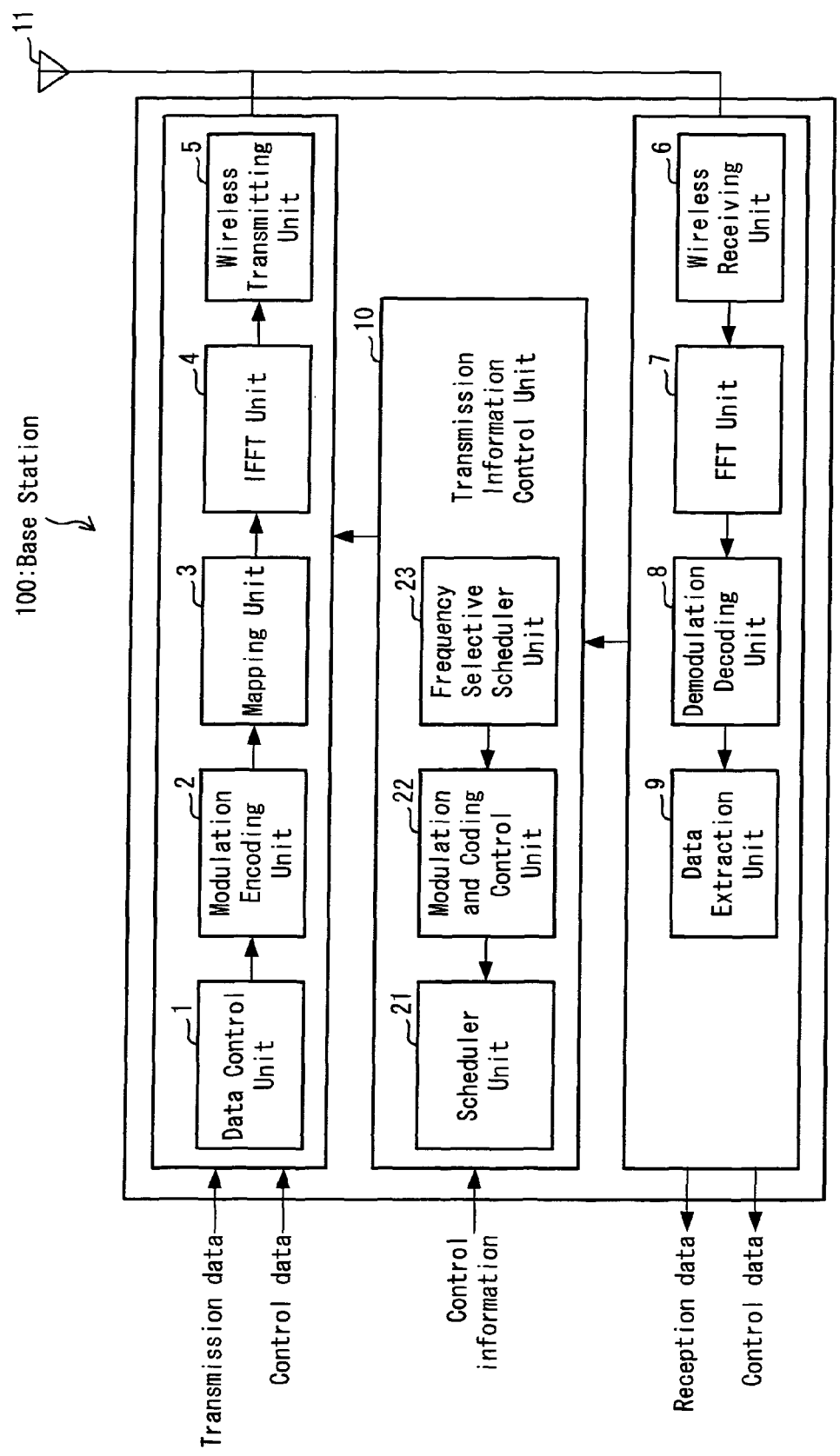
FIG. 8 is a functional block diagram showing a schematic configuration example of a base station according to the present invention.

FIG. 8 is a functional block diagram showing a schematic configuration example of a base station according to the present invention.

As shown in FIG. 8, a base station 100 comprises a data control unit 1, a modulation encoding unit 2, a mapping unit 3, an inverse fast Fourier transform (IFFT) unit 4, a wireless transmitting unit 5, a wireless receiving unit 6, a fast Fourier transform (FFT) unit 7, a demodulation decoding unit 8, a data extraction unit 9, a transmission information control unit 10, and an antenna 11. The transmission information control unit 10 includes a scheduler unit 21, a modulation and coding control unit 22, and a frequency selective scheduler unit 23.

In the base station 100, transmission data and control data to be transmitted to each user equipment are inputted to the data control unit 1, and the data is sequentially transmitted to the user equipment according to an instruction from the transmission information control unit 10. The modulation encoding unit 2 performs a modulation processing or an error correction coding processing upon a signal outputted from the data control unit 1 based on modulation scheme and coding rate determined by the transmission information control unit 10 (modulation and coding control unit 22) and outputs the data to the mapping unit 3. The mapping unit 3 maps the data outputted from the modulation encoding unit 2 on each sub-carrier based on frequency selective scheduling information outputted from the transmission information control unit 10 (frequency selective scheduler unit 23) and outputs the data to the inverse fast Fourier transform unit 4.

The inverse fast Fourier transform unit 4 performs a processing of inverse fast Fourier transform upon the data outputted from the mapping unit 3, converts the data to a time-series base-band digital signal, and outputs the signal to the wireless transmitting unit 5. The wireless transmitting unit 5 performs digital/analog conversion of the output signal from the inverse fast Fourier transform unit 4, up-converts the signal to a frequency suitable for transmission, and then transmits the signal to each user equipment through the antenna 11.

The scheduler unit 21 schedules the downlink and the uplink based on control information, such as a resource region that each user equipment may use, an intermittent transmission reception cycle, a format of transmission data channel and a buffer status. The modulating and coding control unit 22 determines the modulation scheme and the coding rate to be applied to each data based on the sounding reference signal transmitted from the user equipment. The frequency selective scheduler unit 23 executes a processing of frequency selective scheduling to be applied to each data based on the sounding reference signal transmitted from the user equipment. The data extraction unit 9 separates demodulated and decoded data into reception data for user and control data, transfers the data to a superior processing unit, and outputs the data to the transmission information control unit 27.

As shown in FIG. 8, the various components of the base station may be coupled together or implemented as separate units.

Figure 9:
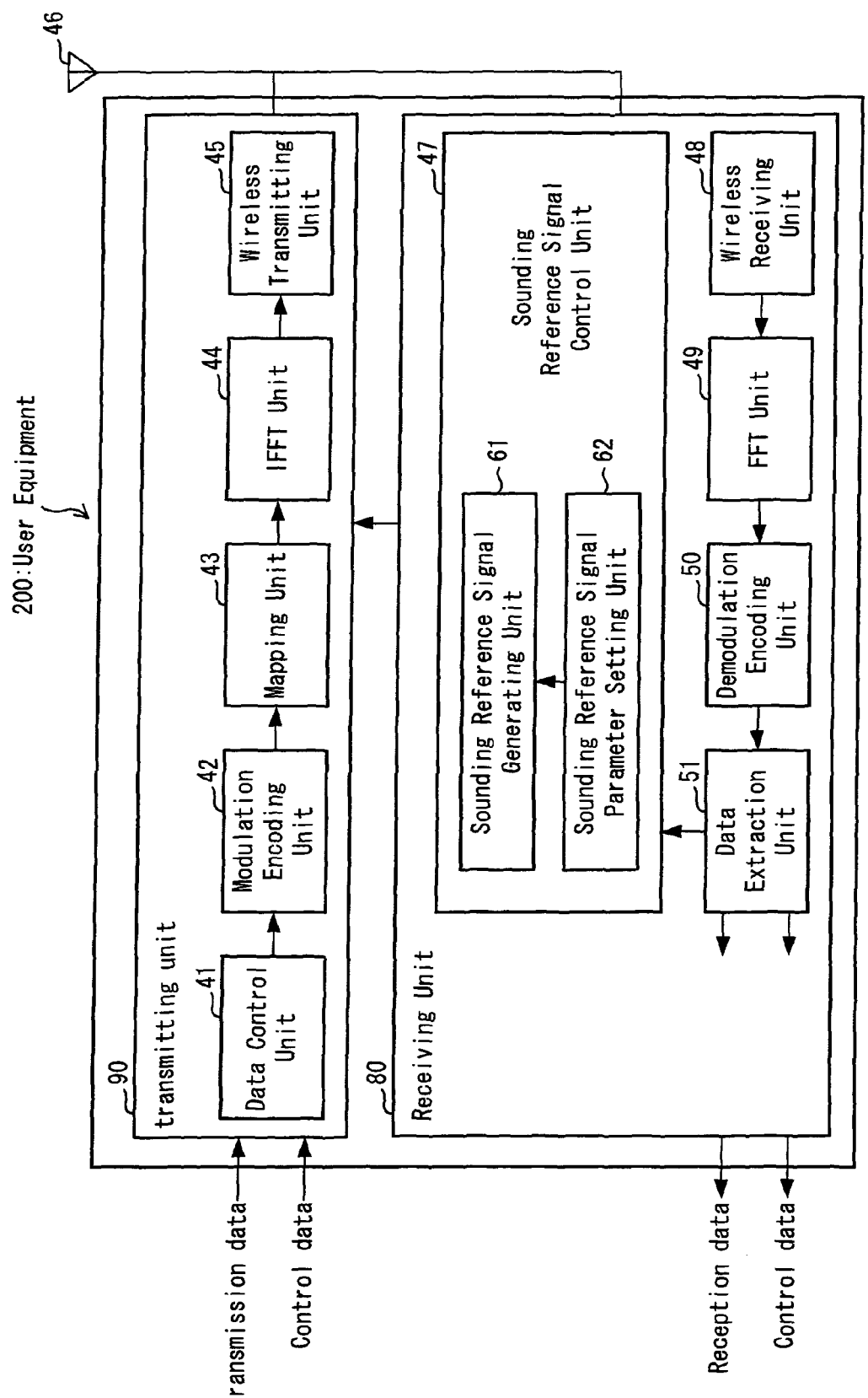
FIG. 9 is a functional block diagram showing a schematic configuration example of a user equipment according to the present invention.

FIG. 9 is a functional block diagram showing a schematic configuration example of user equipment according to the present invention.

As shown in FIG. 9, a user equipment 200 comprises a data control unit 41, a modulation encoding unit 42, a mapping unit 43, an inverse fast Fourier transform (IFFT) unit 44, a wireless transmitting unit 45, an antenna 46, a sounding reference signal control unit 47, a wireless receiving unit 48, a fast Fourier transform (FFT) unit 49, a demodulation decoding unit 50 and a data extraction unit 51. The sounding reference signal control unit 47 comprises a sounding reference signal generating unit 61 and a sounding reference signal parameter setting unit 62.

The wireless receiving unit 48, the FFT unit 49, the demodulation decoding unit 50, the data extraction unit 51, and the sounding reference signal control unit 47 constitute a receiving unit 80 as a whole, and the data control unit 41, the modulation encoding unit 42, the mapping unit 43, the inverse fast Fourier transform (IFFT) unit 44, and the wireless transmitting unit 45 constitute a transmitting unit 90 as a whole.

In the user equipment 200 shown in FIG. 9, transmission data and control data to be transmitted to the base station 100 are inputted to the data control unit 41, and the data is sequentially transmitted to the base station 100. The modulation encoding unit 42 performs a modulation processing or an error correction coding processing upon a signal outputted from the data control unit 41 and outputs the data to the mapping unit 43. The mapping unit 43 maps the data outputted from the modulation encoding unit 42 on each sub-carrier and outputs the data to the inverse fast Fourier transform unit 44.

The inverse fast Fourier transform unit 44 performs a processing of inverse fast Fourier transform upon a symbol sequence outputted from the mapping unit 43, converts the symbol sequence to a time-series base-band digital signal, and outputs the signal to the wireless transmitting unit 45. The wireless transmitting unit 45 performs digital/analog conversion to the output signal from the inverse fast Fourier transform unit 44, up-converts the signal to a frequency suitable for transmission, and then transmits the signal to the base station 100 through the antenna 46.

The sounding reference signal parameter setting unit 62 sets the parameters of the sounding reference signal according the configuration signaling (SRS parameters) received from the base station 100. The sounding reference signal generating unit 61 generates the sounding reference signal to be transmitted to the base station 100 based on the parameters set by the sounding reference signal parameter setting unit 62.

According to the base station shown in FIG. 8 and the user equipment shown in FIG. 9, the communication method for sounding reference signal (especially scheduled SRS transmission) according to the present invention may be realized for example as follows.

The following descriptions are based on the signaling procedure in FIG. 1. However, it is to be noted that the signaling procedure in FIG. 2 or variation example may also be realized by the mobile communication system of the present invention.

The scheduler 21 of the base station cell-specifically configures to a user equipment 200 parameters for SRS transmission and further UE-specifically configures to the user equipment parameters for the scheduled SRS transmission by using the data control unit 1, modulation encoding unit 2, mapping unit 3, IFFT unit 4, wireless transmitting unit 5 and antenna 11 (Step 301 and Step 302). The receiving unit 60 of the user equipment receives the parameters from the base station and the sounding reference signal parameter setting unit 62 sets the parameters needed for scheduled SRS transmission (Step 303). The transmission information control unit 27 of the base station transmits an uplink transmission permission signal for instructing the SRS transmission (the scheduled SRS transmission) to the user equipment. After receiving the uplink transmission permission signal through the antenna 66 (Step 305), the sounding reference signal generating unit 61 of the user equipment generates the sounding reference signal and transmits the scheduled SRS to the base station according to the parameters which are configured cell-specifically and/or UE-specifically (Step 306). After receiving the scheduled SRS on designated resources, the scheduler 21 of the base station estimates uplink channel state of the user equipment and schedules wireless resources. It is noted that the above structure of its signaling processing is only one example according to the present invention, and different modules or its combination may also realize the communication method for scheduled SRS transmission.

In an example of the mobile communication system according to the present invention, the user equipment for scheduled sounding reference signal transmission may comprise: means for receiving an uplink transmission permission signal including information for instructing transmission of the scheduled sounding reference signal, means for generating the scheduled sounding reference signal after receiving the instruction information, and means for transmitting uplink data and the scheduled sounding reference signal in the same subframe, or transmitting the uplink data in a first subframe and the scheduled sounding reference signal in a following subframe. Moreover, the base station for scheduled sounding reference signal transmission may comprise: means for transmitting an uplink transmission permission signal including information for instructing transmission of the scheduled sounding reference signal, and means for receiving uplink data and sounding reference signal which includes the scheduled sounding reference signal from a user equipment, wherein, the user equipment transmits the uplink data and the scheduled sounding reference signal in the same subframe, or transmits the uplink data in a first subframe and the scheduled sounding reference signal in a following subframe.

In another alternative example of the base station in FIG. 8 and the user equipment in FIG. 9, the device (BS or UE) may be implemented to include a processor and a memory.

The memory, which may include both read-only memory (ROM) and random access memory (RAM), provides instructions and data to the processor. A portion of the memory may also include non-volatile random access memory (NVRAM). The memory may include any electronic component capable of storing electronic information, and may be embodied as ROM, RAM, magnetic disk storage media, optical storage media, flash memory, on-board memory included with the processor, EPROM memory, EEPROM memory, registers, a hard disk, a removable disk, a CD-ROM, etc. The memory may store program instructions and other types of data. The program instructions may be executed by the processor to implement some or all of the methods disclosed herein so as to realized the SRS transmission.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks/elements, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic elements, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration. In an alternative embodiment, integrated circuits may be adopt to store programs which realizes the methods at the base station and/or the user equipment when being executed, and the integrated circuits may be mounted on the base station and the user equipment respectively.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

According to the communication method of the present invention, the user equipment transmits the uplink data through a physical uplink shared channel assigned by the uplink transmission permission signal, and transmits the scheduled sounding reference signal on an uplink component carrier identical with an uplink component carrier on which the physical uplink shared channel is assigned by the uplink transmission permission signal.

Therefore, it is not necessary to add additional information for indicating the UL CC for the scheduled SRS transmission, and the base station may achieve more efficient scheduling.

According to the communication method of the present invention, the user equipment transmits the uplink data through a physical uplink shared channel assigned by the uplink transmission permission signal and the scheduled sounding reference signal in the same subframe.

Therefore, the user equipment may transmit the scheduled SRS to the base station in the configured SRS subframes and it is possible for the base station to instruct the scheduled SRS transmission dynamically and immediately.

According to the communication method of the present invention, the base station configures positions of subframes for sounding reference signal transmission to the user equipment.

Therefore, the base station may instruct the scheduled SRS transmission with flexibility.

According to the communication method of the present invention, the base station configures a position of a subframe for the scheduled sounding reference signal transmission to the user equipment, and the subframe for the scheduled sounding reference signal transmission may be selected from the subframes for the sounding reference signal transmission.

Therefore, it is possible to avoid the interference of UEs in the cell.

According to the communication method of the present invention, the base station cell-specifically configures the positions of subframes for the scheduled sounding reference signal transmission to the user equipment, or the base station user-equipment-specifically configures the positions of subframes for the scheduled sounding reference signal transmission to the user equipment. Therefore, the base station may instruct the scheduled SRS transmission with flexibility.

According to the communication method of the present invention, the following subframe is an adjacent subframe for the sounding reference signal transmission after the first subframe, or the following subframe is an adjacent subframe for the scheduled sounding reference signal transmission after the first subframe.

According to the configuration of the base station, it is possible for the base station to instruct the scheduled SRS transmission dynamically and avoid interference of UEs in the cell.

According to the communication method of the present invention, the base station configures a position of a subframe for the scheduled sounding reference signal transmission to the user equipment.

According to the communication method of the present invention, the base station configures respective subframes for the scheduled sounding reference signal transmission on respective uplink component carriers to the user equipment and/or the base station configures respective subframes for sounding reference signal transmission on respective uplink component carriers to the user equipment.

Therefore, it is possible for the base station to perform scheduling so as to avoid the collision between the PUSCH transmission and the scheduled SRS transmission and be able to decrease the interferences in the cell.

According to the communication method of the present invention, the base station assigns resources for the scheduled sounding reference signal to the user equipment by using broadcast channel or radio resource control signal.

Also, a mobile communication system according to the present invention can be expressed as follows.

(1) A mobile communication system with aggregated multiple component carriers in which a mobile station apparatus transmits, to a base station apparatus, uplink data by using a physical uplink shared channel assigned by an uplink transmission permission signal, characterized in that: the base station apparatus transmits, to the mobile station apparatus, the uplink transmission permission signal including the first information for instructing transmission of sounding reference signal, in case that the first information is included in the uplink transmission permission signal; and the mobile station apparatus transmits, to the base station apparatus, the sounding reference signal on a uplink component carrier identical with the uplink component carrier on which the physical uplink shared channel is assigned by the uplink transmission permission signal.

In the mobile communication system, the base station apparatus transmits, to the mobile station apparatus, the uplink transmission permission signal including the second information for indicating the uplink component carrier on which the physical uplink shared channel is assigned by the uplink transmission permission signal.

(2) A mobile communication system in which a mobile station apparatus transmits, to a base station apparatus, uplink data by using a physical uplink shared channel assigned by an uplink transmission permission signal, characterized in that: the base station apparatus transmits, to the mobile station apparatus, the uplink transmission permission signal including information for instructing transmission of sounding reference signal, in case that the information is included in the uplink transmission permission signal; and the mobile station apparatus transmits in the same subframe, to the base station apparatus, the uplink data by using the physical uplink shared channel assigned by the uplink transmission permission signal and the sounding reference signal.

(3) A mobile communication system in which a mobile station apparatus transmits, to a base station apparatus, uplink data by using a physical uplink shared channel assigned by an uplink transmission permission signal, characterized in that: the base station apparatus transmits, to the mobile station apparatus, the uplink transmission permission signal including information for instructing transmission of sounding reference signal, in case that the information is included in the uplink transmission permission signal; and the mobile station apparatus transmits in the first subframe, to the base station apparatus, the uplink data by using the physical uplink shared channel assigned by the uplink transmission permission signal, and transmits in the second subframe, to the base station apparatus, the sounding reference signal.

In the mobile communication system, the base station apparatus sets cell-specifically, to the mobile station apparatus, a position of the second subframes.

In the mobile communication system, the base station apparatus sets UE-specifically, to the mobile station apparatus, a position of the second subframes.

In the mobile communication system, the position of the second subframes UE-specifically set is contained in cell-specifically set subframes.

In the mobile communication system, the base station apparatus sets, to the mobile station apparatus, respective position of the second subframes per component carriers.

In the mobile communication system, the base station apparatus assigns, to the mobile station apparatus, resources for transmission of the sounding reference signal by using a radio resource control signal.

(4) A mobile communication system in which a mobile station apparatus transmits, to a base station apparatus, uplink data by using a physical uplink shared channel assigned by an uplink transmission permission signal, characterized in that: the base station apparatus sets cell-specifically, to the mobile station apparatus, a position of subframes for the mobile station apparatus to transmit sounding reference signal, and transmits, to the mobile station apparatus, the uplink transmission permission signal including information for instructing transmission of sounding reference signal; and the mobile station apparatus transmits in the subframe, to the base station apparatus, the sounding reference signal in case that the information is included in the uplink transmission permission signal.

(5) A mobile station apparatus in a mobile communication system with aggregated multiple component carriers in which a mobile station apparatus transmits, to a base station apparatus, uplink data by using a physical uplink shared channel assigned by an uplink transmission permission signal, the mobile station apparatus characterized by comprising: means for receiving, from the base station apparatus, the uplink transmission permission signal including the first information for instructing transmission of sounding reference signal, in case that the first information is included in the uplink transmission permission signal, and means for transmitting, to the base station apparatus, the sounding reference signal on a uplink component carrier identical with the uplink component carrier on which the physical uplink shared channel is assigned by the uplink transmission permission signal.

The mobile station apparatus comprises means for receiving, from the base station apparatus, the uplink transmission permission signal including the second information for indicating the uplink component carrier on which the physical uplink shared channel is assigned by the uplink transmission permission signal.

(6) A mobile station apparatus in a mobile communication system in which a mobile station apparatus transmits, to a base station apparatus, uplink data by using a physical uplink shared channel assigned by an uplink transmission permission signal, the mobile station apparatus characterized by comprising: means for receiving, from the base station apparatus, the uplink transmission permission signal including information for instructing transmission of sounding reference signal, in case that the information is included in the uplink transmission permission signal, and means for transmitting in the same subframe, to the base station apparatus, the uplink data by using the physical uplink shared channel assigned by the uplink transmission permission signal and the sounding reference signal.

(7) A mobile station apparatus in a mobile communication system in which a mobile station apparatus transmits, to a base station apparatus, uplink data by using a physical uplink shared channel assigned by an uplink transmission permission signal, the mobile station apparatus characterized by comprising: means for receiving, from the base station apparatus, the uplink transmission permission signal including information for instructing transmission of sounding reference signal, in case that the information is included in the uplink transmission permission signal, means for transmitting in the first subframe, to the base station apparatus, the uplink data by using the physical uplink shared channel assigned by the uplink transmission permission signal, and means for transmitting in the second subframe, to the base station apparatus, the sounding reference signal.

The base station apparatus sets cell-specifically, to the mobile station apparatus, a position of the second subframes.

The base station apparatus sets UE-specifically, to the mobile station apparatus, a position of the second subframes.

The position of the second subframes UE-specifically set is contained in cell-specifically set subframes.

The base station apparatus sets, to the mobile station apparatus, respective position of the second subframes per component carriers.

The mobile station apparatus comprises means for receiving, from the base station apparatus, a radio resource control signal which assigns resources for transmission of the sounding reference signal.

(8) A mobile station apparatus in a mobile communication system with aggregated multiple component carriers in which a mobile station apparatus transmits, to a base station apparatus, uplink data by using a physical uplink shared channel assigned by an uplink transmission permission signal, the mobile station apparatus characterized by comprising: means for being set cell-specifically, from the base station apparatus, a position of subframes to transmit sounding reference signal, and means for receiving, from the base station apparatus, the uplink transmission permission signal including information for instructing transmission of sounding reference signal, and means for transmitting in the subframe, to the base station apparatus, the sounding reference signal in case that the information is included in the uplink transmission permission signal.

Some embodiments of the present invention disclose a communication method for sounding reference signal transmission. The method comprises: after receiving an uplink transmission permission signal including information for instructing transmission of scheduled sounding reference signal from a base station, transmitting, by a user equipment, uplink data and the scheduled sounding reference signal in the same subframe, or transmitting the uplink data in a first subframe and the scheduled sounding reference signal in a following subframe.

Some embodiments of the present invention disclose a communication method wherein the user equipment transmits the uplink data through a physical uplink shared channel assigned by the uplink transmission permission signal, and transmits the scheduled sounding reference signal on an uplink component carrier identical with an uplink component carrier on which the physical uplink shared channel is assigned by the uplink transmission permission signal.

Some embodiments of the present invention disclose a communication method wherein the user equipment transmits the uplink data through a physical uplink shared channel assigned by the uplink transmission permission signal and the scheduled sounding reference signal in the same subframe.

Some embodiments of the present invention disclose a communication method wherein the base station configures positions of subframes for sounding reference signal transmission to the user equipment.

Some embodiments of the present invention disclose a communication method wherein the base station configures a position of a subframe for the scheduled sounding reference signal transmission to the user equipment.

Some embodiments of the present invention disclose a communication method wherein the subframe for the scheduled sounding reference signal transmission is selected from the subframes for the sounding reference signal transmission.

Some embodiments of the present invention disclose a communication method wherein the base station cell-specifically configures the positions of subframes for the scheduled sounding reference signal transmission to the user equipment.

Some embodiments of the present invention disclose a communication method wherein the base station user-equipment-specifically configures the positions of subframes for the scheduled sounding reference signal transmission to the user equipment.

Some embodiments of the present invention disclose a communication method wherein the following subframe is an adjacent subframe for the sounding reference signal transmission after the first subframe.

Some embodiments of the present invention disclose a communication method wherein the following subframe is an adjacent subframe for the scheduled sounding reference signal transmission after the first subframe.

Some embodiments of the present invention disclose a communication method wherein the base station configures a position of a subframe for the scheduled sounding reference signal transmission to the user equipment.

Some embodiments of the present invention disclose a communication method wherein the base station configures respective subframe for the scheduled sounding reference signal transmission on respective uplink component carrier to the user equipment.

Some embodiments of the present invention disclose a communication method wherein the base station configures respective subframe for sounding reference signal transmission on respective uplink component carrier to the user equipment.

Some embodiments of the present invention disclose a communication method wherein the base station assigns resources for the scheduled sounding reference signal to the user equipment by using broadcast channel or radio resource control signal.

Some embodiments of the present invention disclose a user equipment for sounding reference signal transmission. The user equipment comprises: means for receiving an uplink transmission permission signal including information for instructing transmission of scheduled sounding reference signal, means for generating the scheduled sounding reference signal after receiving the information for instructing transmission of scheduled sounding reference signal, and means for transmitting uplink data and the scheduled sounding reference signal in the same subframe, or transmitting the uplink data in a first subframe and the scheduled sounding reference signal in a following subframe.

Some embodiments of the present invention disclose a base station for sounding reference signal transmission. The base station comprises: means for transmitting an uplink transmission permission signal including information for instructing transmission of scheduled sounding reference signal, and means for receiving uplink data and sounding reference signal which includes the scheduled sounding reference signal from a user equipment, wherein, the user equipment transmits the uplink data and the scheduled sounding reference signal in the same subframe, or transmits the uplink data in a first subframe and the scheduled sounding reference signal in a following subframe.

Some embodiments of the present invention disclose a mobile communication system for sounding reference signal transmission. The system comprises: a base station transmitting an uplink transmission permission signal including information for instructing transmission of scheduled sounding reference signal, and a user equipment transmitting uplink data and the scheduled sounding reference signal in the same subframe, or transmitting the uplink data in a first subframe and the scheduled sounding reference signal in a following subframe.

Some embodiments of the present invention disclose an integrated circuit mounted in a user equipment for sounding reference signal transmission. The integrated circuit comprises: logic element for receiving an uplink transmission permission signal including information for instructing transmission of scheduled sounding reference signal, logic element for generating the scheduled sounding reference signal after receiving the uplink transmission permission signal, and logic element for transmitting uplink data and the scheduled sounding reference signal in the same subframe, or transmitting the uplink data in a first subframe and the scheduled sounding reference signal in a following subframe.

Some embodiments of the present invention disclose an integrated circuit mounted in a base station for sounding reference signal transmission. The integrated circuit comprises: logic element for transmitting an uplink transmission permission signal including information for instructing transmission of scheduled sounding reference signal, and logic element for receiving uplink data and sounding reference signal which includes the scheduled sounding reference signal from a user equipment, wherein, the user equipment transmits the uplink data and the scheduled sounding reference signal in the same subframe, or transmits the uplink data in a first subframe and the scheduled sounding reference signal in a following subframe.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

INDUSTRIAL APPLICABILITY

The present invention is applicable to any systems such as Third Generation (3G), Super Third Generation (S3G), Fourth Generation (4G) cellular mobile communication and digital televisions, wireless local area network (WLAN), self-organized network (Mesh, Ad Hoc, Censor Network), electronic home (e-Home) network, wireless wide area network (WWAN), and etc.

The invention claimed is:

1. A communication method of a user equipment in a mobile communication system, the communication method comprising:
   receiving, from a base station apparatus, a radio resource control signal including first information indicating a periodicity and a subframe offset, the periodicity and the subframe offset being used for indicating subframes for transmitting a sounding reference signal,
   receiving, from the base station apparatus, downlink control information including second information used for requesting the user equipment to transmit the sounding reference signal, the downlink control information being used for scheduling of a physical uplink shared channel; and
   transmitting, to the base station apparatus, the sounding reference signal in a subframe n' in a case where the second information is detected in a subframe n, the subframe n' being the first one of subframes n+k, the subframes n+k corresponding to at least (i) a condition that the subframes n+k each satisfy k≥4, (ii) the periodicity, and (iii) the subframe offset.

2. An integrated circuit mounted in a user equipment in a mobile communication system, the integrated circuit comprising:
   a circuit configured to receive, from a base station apparatus, a radio resource control signal including first information indicating a periodicity and a subframe offset, the periodicity and the subframe offset being used for indicating subframes for transmitting a sounding reference signal,
   the circuit configured to receive, from the base station apparatus, a downlink control information including second information used for requesting the user equipment to transmit the sounding reference signal, the downlink control information being used for scheduling of a physical uplink shared channel; and
   a circuit configured to transmit, to the base station apparatus, the sounding reference signal in a subframe n' in a case where the second information is detected in a subframe n, the subframe n' being the first one of subframes n+k, the subframes n+k corresponding to at least (i) a condition that the subframes n+k each satisfy k≥4, (ii) the periodicity, and (iii) the subframe offset.

3. A user equipment in a mobile communication system, the user equipment comprising:
   a receiving circuitry configured to and/or programmed to receive, from a base station apparatus, a radio resource control signal including first information indicating a periodicity and a subframe offset, the periodicity and the subframe offset being used for indicating subframes for transmitting a sounding reference signal,
   the receiving circuitry configured to and/or programmed to receive, from the base station apparatus, downlink control information including second information used for requesting the user equipment to transmit the sounding reference signal, the downlink control information being used for scheduling of a physical uplink shared channel; and
   a transmitting circuitry configured to and/or programmed to transmit, to the base station apparatus, the sounding reference signal in a subframe n' in a case where the second information is detected in a subframe n, the subframe n' being the first one of subframes n+k, the subframes n+k corresponding to at least (i) a condition that the subframes n+k each satisfy k≥4, (ii) the periodicity, and (iii) the subframe offset.

4. The user equipment according to claim 3, wherein the subframes for transmitting the sounding reference signal are user-equipment-specifically configured.

5. The user equipment according to claim 4, wherein the subframes for transmitting the sounding reference signal are configured as a subset of subframes which are cell-specifically configured.

6. The user equipment according to claim 5, wherein: the subframes for transmitting the sounding reference signal are configured for each of a plurality of uplink component carriers.

7. The user equipment according to claim 3, wherein the first information is used for aperiodic transmission of the sounding reference signal,
   the radio resource control signal includes both the first information and third information, and
   the third information indicates a periodicity and a subframe offset each used for indicating subframes for periodic transmission of the sounding reference signal.

8. A base station apparatus in a mobile communication system, the base station apparatus comprising:
   a transmitting circuitry configured to and/or programmed to transmit, to a user equipment, a radio resource control signal including first information indicating a periodicity and a subframe offset, the periodicity and the subframe offset being used for indicating subframes for transmitting a sounding reference signal,
   the transmitting circuitry configured to and/or programmed to transmit, to the user equipment, downlink control information including second information used for requesting the user equipment to transmit the sounding reference signal, the downlink control information being used for scheduling of a physical uplink shared channel; and
   a receiving circuitry configured to and/or programmed to receive, from the user equipment, the sounding reference signal in a subframe n' in a case where the second information is transmitted in a subframe n, the subframe n' being the first one of subframes n+k, the subframes n+k corresponding to at least (i) a condition that the subframes n+k each satisfy k≥4, (ii) the periodicity, and (iii) the subframe offset.

9. The base station apparatus according to claim 6, wherein
   the subframes for transmitting the sounding reference signal are user-equipment-specifically configured.

10. The base station apparatus according to claim 7, wherein:
   the subframes for transmitting the sounding reference signal are configured as a subset of subframes which are cell-specifically configured.

11. The base station apparatus according to claim 8, wherein:
the subframes for transmitting the sounding reference signal are configured for each of a plurality of uplink component carriers.

12. The base station apparatus according to claim 8, wherein
the first information is used for aperiodic transmission of the sounding reference signal,
the radio resource control signal includes both the first information and third information, and
the third information indicates a periodicity and a subframe offset each used for indicating subframes for periodic transmission of the sounding reference signal.

13. A communication method of a base station apparatus in a mobile communication system, the communication method comprising:
transmitting, to a user equipment, a radio resource control signal including first information indicating a periodicity and a subframe offset, the periodicity and the subframe offset being used for indicating subframes for transmitting a sounding reference signal,
transmitting, to the user equipment, downlink control information including second information used for requesting the user equipment to transmit the sounding reference signal, the downlink control information being used for scheduling of a physical uplink shared channel; and
receiving, from the user equipment, the sounding reference signal in a subframe n' in a case where the second information is transmitted in a subframe n, the subframe n' being the first one of subframes n+k, the subframes n+k corresponding to at least (i) a condition that the subframes n+k each satisfy k≥4, (ii) the periodicity, and (iii) the subframe offset.

14. An integrated circuit mounted in a base station apparatus in a mobile communication system, the integrated circuit comprising:
a circuit configured to transmit, to a user equipment, a radio resource control signal including first information indicating a periodicity and a subframe offset, the periodicity and the subframe offset being used for indicating subframes for transmitting a sounding reference signal,
the circuit configured to transmit, to the user equipment, downlink control information including second information used for requesting the user equipment to transmit the sounding reference signal, the downlink control information being used for scheduling of a physical uplink shared channel; and
a circuit configured to receive, from the user equipment, the sounding reference signal in a subframe n' in a case where the second information is transmitted in a subframe n, the subframe n' being the first one of subframes n+k, the subframes n+k corresponding to at least (i) a condition that the subframes n+k each satisfy k≥4, (ii) the periodicity, and (iii) the subframe offset.

* * * * *